US010585453B2

(12) United States Patent
Jung et al.

(10) Patent No.: US 10,585,453 B2
(45) Date of Patent: Mar. 10, 2020

(54) ELECTRONIC DEVICE AND METHOD FOR COMMUNICATING WITH EXTERNAL ELECTRONIC DEVICE

(71) Applicant: SAMSUNG ELECTRONICS CO., LTD., Suwon-si, Gyeonggi-do (KR)

(72) Inventors: Bu-Seop Jung, Suwon-si (KR); Guneet Singh Khurana, Suwon-si (KR); Soon-Ho Lee, Seoul (KR); Woo-Kwang Lee, Suwon-si (KR); Yong-Seok Jang, Suwon-si (KR); Doo-Suk Kang, Suwon-si (KR); Min-Jung Kim, Hwaseong-si (KR); Bo-Kun Choi, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 73 days.

(21) Appl. No.: 16/017,029

(22) Filed: Jun. 25, 2018

(65) Prior Publication Data
US 2019/0079557 A1 Mar. 14, 2019

(30) Foreign Application Priority Data

Sep. 11, 2017 (KR) .................. 10-2017-0116106

(51) Int. Cl.
G06F 1/16 (2006.01)
G06F 13/42 (2006.01)
(Continued)

(52) U.S. Cl.
CPC .......... *G06F 1/1626* (2013.01); *G06F 1/1605* (2013.01); *G06F 1/1683* (2013.01);
(Continued)

(58) Field of Classification Search
CPC .. G06F 13/4282; G06F 1/1605; G06F 1/1626; G06F 1/1683; G06F 3/044;
(Continued)

(56) References Cited

U.S. PATENT DOCUMENTS 7,584,313 B1 * 9/2009 Hay ...................... G06F 13/385
710/15
7,596,646 B2 * 9/2009 Kim ........................ G06F 13/38
710/52
(Continued)

FOREIGN PATENT DOCUMENTS

KR 10-2002-0022859 3/2002
KR 10-2016-0005754 1/2016
(Continued)

OTHER PUBLICATIONS

Embedded System for Communicating Data between USB and Wi-Fi, Anurag A. Deshpande; P. Malathi, 2014 International Conference on Computational Intelligence and Communication Networks, Nov. 14-16, 2014.*
(Continued)

*Primary Examiner* — Greg C Bengzon
(74) *Attorney, Agent, or Firm* — Nixon & Vanderhye, P.C.

(57) ABSTRACT

An electronic device according to various embodiments includes a housing; a user interface; a wireless communication circuit disposed in the housing; a wired communication interface exposed through the housing; a processor disposed in the housing and electrically connected to the user interface, the wireless communication circuit, and the wired communication interface; and a memory disposed in the housing and electrically connected to the processor, wherein the memory stores instructions that, when executed by the processor, cause the electronic device to establish a first communication channel with an external electronic (Continued)

device including a storage using the wireless communication circuit and/or the wired communication interface so that the electronic device operates as a device and the external electronic device operates as a host, to exchange information with the external electronic device through the first communication channel, and to establish a second communication channel with the external electronic device using the wireless communication circuit so that the electronic device operates as a host and the external electronic device operates as a device.

12 Claims, 20 Drawing Sheets

(51) Int. Cl.
    *G06F 3/044*     (2006.01)
    *G06F 3/0488*     (2013.01)
    *G06Q 30/02*     (2012.01)

(52) U.S. Cl.
    CPC ............ *G06F 3/044* (2013.01); *G06F 3/0488* (2013.01); *G06F 13/4282* (2013.01); *G06Q 30/0241* (2013.01)

(58) Field of Classification Search
    CPC .. G06F 3/0488; G06F 13/385; G06F 3/04817; G06F 3/0482; G06F 13/387; G06Q 30/0241; H04L 67/1068; H04L 67/1074; H04L 67/1076; H04L 67/1078; H04L 67/1085; H04L 67/1091; H04L 67/1093; H04L 67/1095; H04L 67/1097; H04L 67/141; H04L 67/146; H04L 67/147; H04L 67/148; H04L 69/18; H04L 12/2803; H04L 12/2816; H04L 12/282; H04L 12/2829; H04L 12/2832; H04L 2012/2841; H04L 12/2809; H04L 12/2812; H04L 67/16; H04L 12/2814; H04L 41/12; H04L 61/2038; H04L 67/104; H04L 69/329; H04L 67/1046; H04L 67/1063; H04L 12/1822; H04L 41/0809; H04L 41/0896; H04L 67/1051; H04L 67/12; H04L 67/1061; H04L 67/14; H04M 1/7253; H04M 1/72533; H04M 2250/06; H04M 1/72527; H04W 84/12; H04W 4/80; H04W 88/08; H04W 76/14; H04W 28/18; H04W 40/246; H04W 48/16; H04W 76/11; H04W 80/12; H04W 84/20; H04W 8/005; H04W 24/10; H04W 74/085; H04W 76/15; H04W 36/14; H04W 48/14; H04W 76/10; H04W 76/12; H04W 84/18; H04W 88/04; H04W 88/06; H04W 92/10; G08C 17/02; G08C 2201/40; G08C 2201/93; H04N 21/4126; H04N 21/41407; H04N 21/47; H04N 21/43615

See application file for complete search history.

(56) References Cited

U.S. PATENT DOCUMENTS

| | | | | |
|---|---|---|---|---|
| 9,015,775 | B2* | 4/2015 | Perlman | H04N 7/24 725/74 |
| 9,451,656 | B2* | 9/2016 | Stice | H04W 76/14 |
| 9,722,979 | B2* | 8/2017 | Park | H04L 29/1232 |
| 9,766,688 | B2* | 9/2017 | Kim | G06F 13/4072 |
| 10,282,333 | B2* | 5/2019 | Kim | G06F 13/4295 |
| 2005/0288058 | A1* | 12/2005 | Chandhok | H04M 1/04 455/556.1 |
| 2006/0288343 | A1* | 12/2006 | Pallister | H04L 67/34 717/168 |
| 2007/0070966 | A1* | 3/2007 | Sung | H04W 48/12 370/338 |
| 2007/0086401 | A1* | 4/2007 | Hong | H04W 72/0406 370/338 |
| 2007/0086421 | A1* | 4/2007 | Hong | H04W 88/04 370/349 |
| 2008/0117886 | A1* | 5/2008 | Kim | H04L 12/4625 370/338 |
| 2008/0215774 | A1* | 9/2008 | Kim | G06F 13/128 710/62 |
| 2008/0301351 | A1* | 12/2008 | Lee | H04W 8/005 710/313 |
| 2009/0031061 | A1* | 1/2009 | Lee | G06F 13/387 710/63 |
| 2009/0144459 | A1* | 6/2009 | Son | G06F 1/1632 710/14 |
| 2010/0035650 | A1* | 2/2010 | Gottehrer | G06F 1/1632 455/558 |
| 2010/0150115 | A1* | 6/2010 | Kim | H04W 72/1289 370/336 |
| 2011/0188391 | A1* | 8/2011 | Sella | H04W 24/10 370/252 |
| 2012/0096132 | A1* | 4/2012 | Lim | H04L 12/66 709/220 |
| 2013/0099591 | A1* | 4/2013 | Yeo | H02M 3/3376 307/104 |
| 2013/0128311 | A1* | 5/2013 | Kim | G06F 3/1296 358/1.15 |
| 2013/0229944 | A1* | 9/2013 | Montemurro | H04W 4/21 370/254 |
| 2013/0304866 | A1* | 11/2013 | Wu | H04L 67/1097 709/219 |
| 2013/0311694 | A1* | 11/2013 | Bhamidipati | H04M 1/7253 710/303 |
| 2014/0059264 | A1* | 2/2014 | Sudak | H02G 3/02 710/303 |
| 2014/0085666 | A1* | 3/2014 | Park | G06K 15/405 358/1.15 |
| 2014/0092425 | A1* | 4/2014 | Park | G06F 3/1292 358/1.15 |
| 2014/0095755 | A1* | 4/2014 | Gao | G06F 13/387 710/303 |
| 2014/0120829 | A1* | 5/2014 | Bhamidipati | H04N 21/42207 455/3.06 |
| 2014/0189172 | A1* | 7/2014 | Sadeghi | G06F 13/385 710/105 |
| 2014/0254575 | A1* | 9/2014 | Venkatraman | H04W 48/16 370/338 |
| 2014/0287690 | A1* | 9/2014 | Kim | H04W 4/80 455/41.3 |
| 2014/0337544 | A1* | 11/2014 | Huang | G06F 13/385 710/63 |
| 2015/0016417 | A1* | 1/2015 | Dees | H04W 88/08 370/331 |
| 2015/0019856 | A1* | 1/2015 | Kim | G06F 21/575 713/2 |
| 2015/0084748 | A1* | 3/2015 | Davis | G08C 17/02 340/12.5 |
| 2015/0205550 | A1* | 7/2015 | Lee | G06F 3/1204 358/1.15 |
| 2015/0205747 | A1* | 7/2015 | Dees | H04M 1/7253 710/303 |
| 2015/0334513 | A1* | 11/2015 | Lotito | H04M 1/7253 455/41.1 |
| 2016/0014172 | A1* | 1/2016 | Van De Laar | H04L 65/403 709/229 |
| 2016/0081132 | A1* | 3/2016 | Lee | H04W 76/10 |
| 2016/0134996 | A1* | 5/2016 | Verma | H04L 12/1822 709/205 |
| 2016/0135233 | A1* | 5/2016 | Fujita | G08C 17/00 370/329 |

(56) References Cited

U.S. PATENT DOCUMENTS

| | | | |
|---|---|---|---|
| 2016/0179722 A1* | 6/2016 | Nakanishi | G06F 13/362 |
| | | | 710/106 |
| 2016/0205199 A1* | 7/2016 | Patil | H04W 76/14 |
| | | | 709/223 |
| 2016/0212226 A1* | 7/2016 | Patil | H04L 67/16 |
| 2016/0334837 A1* | 11/2016 | Dees | H04L 67/16 |
| 2017/0048373 A1* | 2/2017 | Dees | H04L 12/2809 |
| 2017/0150339 A1* | 5/2017 | Sadeghi | H04W 48/16 |
| 2017/0202036 A1* | 7/2017 | Ko | H04W 8/005 |
| 2017/0223758 A1* | 8/2017 | Jung | H04W 76/14 |
| 2017/0264359 A1* | 9/2017 | Bernsen | H04N 21/2387 |
| 2017/0289277 A1* | 10/2017 | Lee | H04L 29/08 |
| 2017/0374183 A1* | 12/2017 | Young | H03F 3/24 |
| 2018/0176113 A1* | 6/2018 | Thota | H04L 43/12 |
| 2018/0359633 A1* | 12/2018 | Liu | H04L 9/0861 |
| 2018/0376400 A1* | 12/2018 | Chaki | H04L 67/104 |

FOREIGN PATENT DOCUMENTS

| | | |
|---|---|---|
| KR | 10-2016-0044565 | 4/2016 |
| KR | 10-2016-0045845 | 4/2016 |

OTHER PUBLICATIONS

Extended Search Report dated Jan. 4, 2019 in counterpart European Patent Application No. 18193516.4.
Anonymous, Wireless Universal Serial Bus Specification, Revision 1.1, Sep. 9, 2010, XP055421631 (325 pages).
Search Report and Written Opinion dated Dec. 13, 2018 in counterpart International Patent Application No. PCT/KR2018/010598.

* cited by examiner

ELECTRONIC DEVICE AND METHOD FOR COMMUNICATING WITH EXTERNAL ELECTRONIC DEVICE

CROSS-REFERENCE TO RELATED APPLICATION

This application is based on and claims priority under 35 U.S.C. § 119 to Korean Patent Application No. 10-2017-0116106, filed on Sep. 11, 2017, in the Korean Intellectual Property Office, the disclosure of which is incorporated hereby by reference in its entirety.

BACKGROUND

1. Field

The present disclosure relates to an electronic device and method for communicating with an external electronic device as a host and a device.

2. Description of Related Art

Recently, an electronic device may be connected using a wired or wireless connection to an external electronic device. For example, an electronic device may be connected in a wired manner to an external electronic device using a USB cable to perform data communication. In this case, one electronic device operates as a USB host and the other electronic device operates as a USB device. In another example, when an electronic device is wirelessly communicatively coupled to an external electronic device via a Wi-Fi serial bus (WSB), one of the connected electronic devices operates as a (universal serial bus) USB host and the other one thereof operates as a USB device.

In a case in which an electronic device is connected via a wire or wirelessly to an external electronic device, the electronic device can check and use files stored in the external electronic device when operating as a host, but cannot check and use the files stored in the external electronic device when operating as a device, so that services provided by the electronic device may be restricted.

SUMMARY

According to various embodiments, an electronic device may operate as a host and a device in connection with an external electronic device.

According to various embodiments, an electronic device may include a housing; a user interface; a wireless communication circuit disposed in the housing; a wired communication interface comprising interface circuitry exposed through the housing; a processor disposed in the housing and electrically connected to the user interface, the wireless communication circuit, and the wired communication interface; and a memory disposed in the housing and electrically connected to the processor, wherein the memory stores instructions that, when executed by the processor, cause the electronic device to establish a first communication channel with an external electronic device including a storage unit using the wireless communication circuit or the wired communication interface so that the electronic device operates as a device and the external electronic device operates as a host, to exchange information with the external electronic device through the first communication channel after the first communication channel is established, and to establish a second communication channel with the external electronic device using the wireless communication circuit so that the electronic device operates as a host and the external electronic device operates as a device.

According to various embodiments, an electronic device may include a housing; a user interface; a wireless communication circuit disposed in the housing; a processor disposed in the housing and electrically connected to the user interface and the wireless communication circuit; and a memory disposed in the housing and electrically connected to the processor, wherein the memory stores instructions which, when executed by the processor, cause the electronic device to establish a first communication channel with an external electronic device including a storage unit using the wireless communication circuit so that the electronic device operates as a device and the external electronic device operates as a host, to exchange information with the external electronic device through the first communication channel after the first communication channel is established, and to establish a second communication channel with the external electronic device using the wireless communication circuit so that the electronic device operates as a host and the external electronic device operates as a device.

According to various embodiments, an electronic device may include a housing; a user interface; a wireless communication circuit disposed in the housing; a wired communication interface exposed through the housing; a processor disposed in the housing and electrically connected to the user interface, the wireless communication circuit, and the wired communication interface; and a memory disposed in the housing and electrically connected to the processor, wherein the memory stores instructions which, when executed by the processor, cause the electronic device to establish a first communication channel with an external electronic device including a storage unit using the wireless communication circuit or the wired communication interface so that the electronic device operates as a host and the external electronic device operates as a device, to exchange information with the external electronic device through the first communication channel after the first communication channel is established, and to establish a second communication channel with the external electronic device using the wireless communication circuit so that the electronic device operates as a device and the external electronic device operates as a host.

According to various embodiments, an electronic device may perform functions of a host and a device when being connected to an external electronic device, by providing a dual role between the electronic devices.

According to various example embodiments, the electronic device may perform functions of a host and a device without performing a reconnection with an external electronic device.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
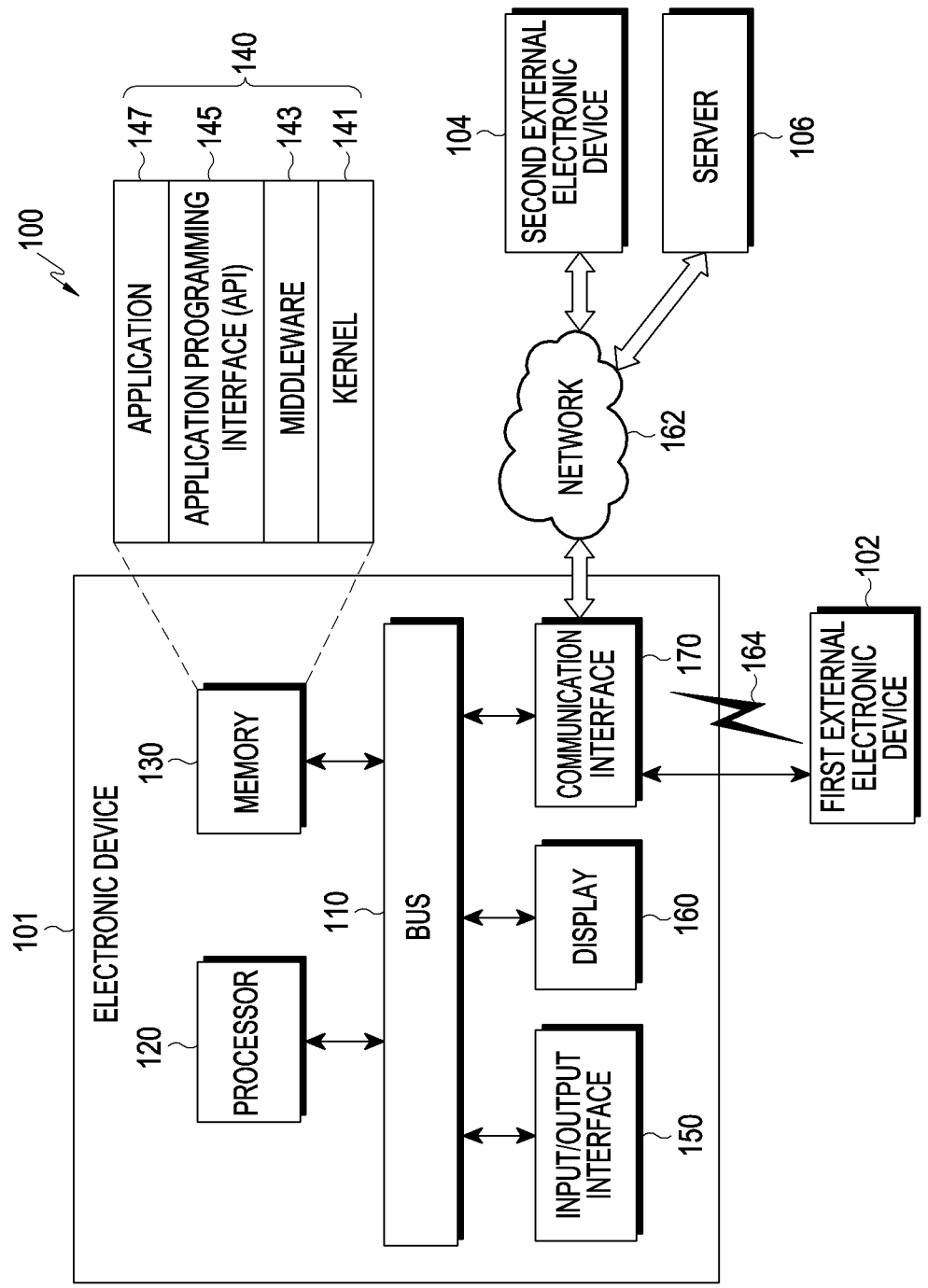
FIG. 1 is a diagram illustrating an electronic device in a network environment according to various embodiments.

Hereinafter, various example embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar elements. A singular expression may include a plural expression unless they are definitely different in a context. As used herein, singular forms may include plural forms as well unless the context clearly indicates otherwise.

The expression "a first", "a second", "the first", or "the second" used in various embodiments may be used to refer to various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "designed to", "adapted to", "made to", or "capable of" in terms of hardware or software, according to circumstances. In some situations, the expression "device configured to" may refer to a situation in which the device, together with other devices or components, "is able to". For example, the phrase "processor adapted (or configured) to perform A, B, and C" may refer, for example, and without limitation, to a dedicated processor (e.g., embedded processor) for performing the corresponding operations, a generic-purpose processor (e.g., Central Processing Unit (CPU) or Application Processor (AP)) that can perform the corresponding operations by executing one or more software programs stored in a memory device, or the like.

An electronic device according to various embodiments may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and/or a wearable device, or the like, but is not limited thereto.

According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and/or a bio-implantable type (e.g., an implantable circuit), or the like, but is not limited thereto.

In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and/or an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, and/or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, an electronic device may include at least one of a part of furniture or a building/structure, an electronic board, an electronic signature receiving device, a projector, and/or various types of measuring instruments (e.g., a water meter, an electric meter, a gas meter, a radio wave meter, and the like), or the like, but is not limited thereto.

In various embodiments, the electronic device may be flexible, or may be a combination of one or more of the aforementioned various devices. The electronic device according to an example embodiment is not limited to the above described devices. In the present disclosure, the term "user" may indicate a person using an electronic device or a device (e.g., an artificial intelligence electronic device) using an electronic device.

Referring to FIG. 1, according to various embodiments, an electronic device 101 in a network environment 100 is described.

The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to some embodiments, at least one of the components of the electronic device 101 may be omitted, or other components may be additionally included in the electronic device 101.

The bus 110 may include a circuit that interconnects the components 120 to 170 and transfers communication (e.g., a control messages or data) between the components.

The processor 120 may include various processing circuitry, such as, for example, and without limitation, one or more of a dedicated processor, a central processing unit (CPU), an application processor (AP), and/or a communication processor (CP), or the like. The processor 120 may, for example, perform an operation or data processing on control or communication of at least one other component of the electronic device 101.

The memory 130 may include a volatile and/or non-volatile memory. The memory 130 may store, for example, instructions or data relevant to at least one other component of the electronic device 101. According to an example embodiment, the memory 130 may store software or a program 140. The program 140 may include, for example, a kernel 141, a middleware 143, an application programming interface (API) 145, and/or an application program (or "application") 147. At least some of the kernel 141, the middleware 143, and the API 145 may be referred to as an operating system (OS). The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middle ware 143, the API 145, or the application 147 may access the individual components of the electronic device 101 to control or manage the system resources.

The middleware 143 may function as, for example, an intermediary for allowing the API 145 or the application 147 to communicate with the kernel 141 to exchange data. In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147, and may process the one or more task requests. The API 145 is an interface through which the applications 147 control functions provided from the kernel 141 or the middleware 143, and may include, for example, at least one interface or function (e.g., instruction) for file control, window control, image processing, or text control.

The input/output interface 150 may include various input/output circuitry and, for example, transfer instructions or data input from a user or another external device to the other component(s) of the electronic device 101, or may output the instructions or data received from the other component(s) of the electronic device 101 to the user or another external device.

The display 160 may include, for example, and without limitation, a liquid crystal display (LCD), a light emitting diode (LED) display, an organic LED (OLED) display, a micro-electro-mechanical systems (MEMS) display, and/or an electronic paper display, or the like. The display 160, for example, may display various types of content (e.g., text, images, videos, icons, or symbols) to the user. The display 160 may include a touch screen and receive, for example, a touch, gesture, proximity, or hovering input using an electronic pen or a body part of a user.

The communication interface 170 may include various communication circuitry and, for example, may set communication between the electronic device 101 and an external electronic device (e.g., a first external electronic device 102, a second external electronic device 104, or a server 106). For example, the communication interface 170 may be connected to a network 162 through wireless or wired communication to communicate with the external electronic device (e.g., the second external electronic device 104 or the server 106). For example, the communication interface 170 may perform wireless communication 164 with at least one first external electronic device 102 based on at least one WSB communication.

The wireless communication may include cellular communication using at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM). According to an example embodiment, as exemplified as a component 164 of FIG. 1, the wireless communication may include at least one of, for example, wireless fidelity (Wi-Fi), light fidelity (LiFi), Bluetooth (BT), BT low energy (BLE), Zigbee, near field communication (NFC), magnetic secure transmission, radio frequency (RF), and body area network (BAN). According to an example embodiment, the wireless communication may also include a global navigation satellite system (GNSS). The GNSS may be a global positioning system (GPS), global navigation satellite system (Glonass), Beidou navigation satellite system (hereinafter, referred to as "Beidou"), Galileo, or the European global satellite-based navigation system. Hereinafter, in the present disclosure, "GPS" and "GNSS" may be used interchangeably. The wired communication of the communication interface 170 may include at least one of, for example, universal serial bus (USB), high definition multimedia interface (HDMI), recommended standard 232 (RS-232), power line communication, and plain old telephone service (POTS). The network 162 may include at least one of, for example, a telecommunications network, e.g., a computer network (e.g., local area network (LAN) or wide area network (WAN)), the Internet, and a telephone network.

Each of the first and second external electronic devices 102 and 104 may be of a type identical to or different from that of the electronic device 101. According to various embodiments, all or some of the operations performed in the electronic device 101 may be performed in another electronic device or a plurality of electronic devices (e.g., the electronic device 102 and the electronic device 104 or the server 106). According to an example embodiment, when the electronic device 101 has to perform some functions or services automatically or in response to a request, the electronic device 101 may make a request for performing at least some functions relating thereto to another device (e.g., the electronic device 102 or the electronic device 104 or the server 106) instead of performing the functions or services by itself or in addition. Another electronic device (e.g., the electronic device 102 or the electronic device 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, and/or client-server computing technology, or the like, may be used.

According to various embodiments, an electronic device (e.g., the electronic device 101 of FIG. 1) may include a housing; a user interface, a wireless communication circuit (e.g., the communication interface 170 of FIG. 1) disposed in the housing; a wired communication interface (e.g., the input/output interface 150 of FIG. 1) exposed through the housing; a processor (e.g., the processor 120 of FIG. 1) disposed in the housing and electrically connected to the user interface, the wireless communication circuit, and the wired communication interface; and a memory (e.g., the memory 130 of FIG. 1) disposed in the housing and electrically connected to the processor, wherein the memory stores instructions which, when executed by the processor, cause the electronic device to: establish a first communication channel with an external electronic device (e.g., the first external electronic device 102 of FIG. 1) including a storage unit, using the wireless communication circuit or the wired communication interface so that the electronic device operates as a device and the external electronic device operates as a host; to exchange information with the electronic device through the first communication channel; and to establish a second communication channel with the external electronic device using the wireless communication circuit so that the electronic device operates as a host and the external electronic device operates as a device.

According to an example embodiment, the wired communication interface may include a USB interface.

According to an example embodiment, the wireless communication circuit may support a Wi-Fi serial bus (WSB) or a wireless USB protocol.

According to an example embodiment, when the first communication channel is established through the wired communication interface, the instructions may, when executed by the processor, cause the electronic device to exchange information including at least one of a peer to peer (P2P) address, a USB role exchange, and capability of the WSB.

According to an example embodiment, when the first communication channel is established using the wireless communication circuit, the instructions may, when executed by the processor, cause the electronic device to exchange information including at least one of a service name for the second communication channel, an advertisement identifier, and service information through discovery with the external electronic device.

According to an example embodiment, the instructions may, when executed by the processor cause the electronic device to retrieve information about files stored in the storage unit of the external electronic device through the second communication channel.

According to various embodiments, an electronic device (e.g., the electronic device 101 of FIG. 1) may include a housing; a user interface; a wireless communication circuit (e.g., the communication interface 170 of FIG. 1) disposed in the housing; a processor (e.g., the processor 120 of FIG. 10) disposed in the housing and electrically connected to the user interface and the wireless communication circuit (e.g., the communication interface 170 of FIG. 1); and a memory (e.g., the memory 130 of FIG. 1) disposed in the housing and electrically connected to the processor, wherein the memory stores instructions which, when executed by the processor, cause the electronic device to: establish a first communication channel with an external electronic device (e.g., the first external electronic device 102 of FIG. 1) including a storage unit, using the wireless communication circuit so that the electronic device operates as a device and the external electronic device operates as a host; to exchange information with the external electronic device through the first communication channel; and to establish a second communication channel with the external electronic device using the wireless communication circuit so that the electronic device operates as a host and the external electronic device operates as a device.

According to an example embodiment, the wireless communication circuit may support a WSB or a wireless USB protocol.

According to an example embodiment, when the first communication channel is established using first discovery through the wireless communication circuit, the instructions may, when executed by the processor, cause the electronic device to exchange information including at least one of an advertisement identifier for the first communication channel, a session MAC for the first communication, a session identifier for the first communication, and session information about the first communication.

According to an example embodiment, when the first communication channel is established using second discovery through the wireless communication circuit, the instructions may, when executed by the processor, cause the electronic device to exchange information including at least one of an advertisement identifier for the second communication channel, a session MAC for the second communication channel, a session identifier, and session information about the second communication channel in order to establish the second communication channel.

According to an example embodiment, the instructions may, when executed by the processor, cause the electronic device to exchange a multi-service name, a multi-advertisement identifier, service information, and information about dual role capability to perform a multi-connection with the external electronic device through first discovery.

According to an example embodiment, when the first communication channel is established with the external electronic device using the first discovery, the instructions may, when executed by the processor, cause the electronic device to exchange information including at least one of an advertisement identifier for the first communication, a session MAC for the first communication, a session identifier for the first communication, and session information about the first communication.

According to an example embodiment, when the second communication channel is established after the first communication channel is established, the instructions may, when executed by the processor, cause the electronic device to exchange information including at least one of an advertisement identifier for the second communication, a session MAC for the second communication, a session identifier for the second communication, and session information about the second communication.

According to an example embodiment, after the first communication channel using a first Wi-Fi direct group is established through the wireless communication circuit, the instructions may, when executed by the processor, cause the electronic device to exchange information including at least one of an advertisement identifier for the first Wi-Fi direct group, a session MAC, a session identifier, and session information.

According to an example embodiment, after the second communication channel using a second Wi-Fi direct group is established through the wireless communication circuit, the instructions may, when executed by the processor, cause the electronic device to exchange information including at least one of an advertisement identifier for the second Wi-Fi direct group, a session MAC, a session identifier, and session information.

According to an example embodiment, the instructions may, when executed by the processor, cause the electronic device to retrieve information about files stored in the storage unit of the external electronic device through the second communication channel.

According to various embodiments, an electronic device (e.g., the electronic device 101 of FIG. 1) may include a housing; a user interface; a wireless communication circuit (e.g., the communication interface 170 of FIG. 1) disposed in the housing; a wired communication interface (e.g., the input/output interface 150 of FIG. 1) exposed through the housing; a processor (e.g., the processor 120 of FIG. 1) disposed in the housing and electrically connected to the user interface, the wireless communication circuit, and the wired communication interface; and a memory (e.g., the memory 130 of FIG. 1) disposed in the housing and electrically connected to the processor, wherein the memory stores instructions that, when executed by the processor, cause the electronic device to establish a first communication channel with an external electronic device (e.g., the first external electronic device 102 of FIG. 1) including a storage unit, using the wireless communication circuit or the wired communication interface so that the electronic device operates as a host and the external electronic device operates as a device; to exchange information with the external electronic device through the first communication channel; and to establish a second communication channel with the external electronic device using the wireless communication circuit so that the electronic device operates as a device and the external electronic device operates as a host.

According to an example embodiment, when the first communication channel is established through the wired communication interface, the instructions may, when executed by the processor, cause the electronic device to exchange information including at least one of a P2P address, USB role exchange, and capability of the WSB based on the first communication channel.

According to an example embodiment, when the first communication channel is established using the wireless communication circuit, the instructions may, when executed by the processor, cause the electronic device to exchange information including at least one of a service name for the second communication channel, an advertisement identifier, and service information through discovery with the external electronic device.

According to an example embodiment, the instructions may, when executed by the processor, cause the electronic device to retrieve information about files stored in the storage unit of the external electronic device through the second communication channel.

Figure 2:
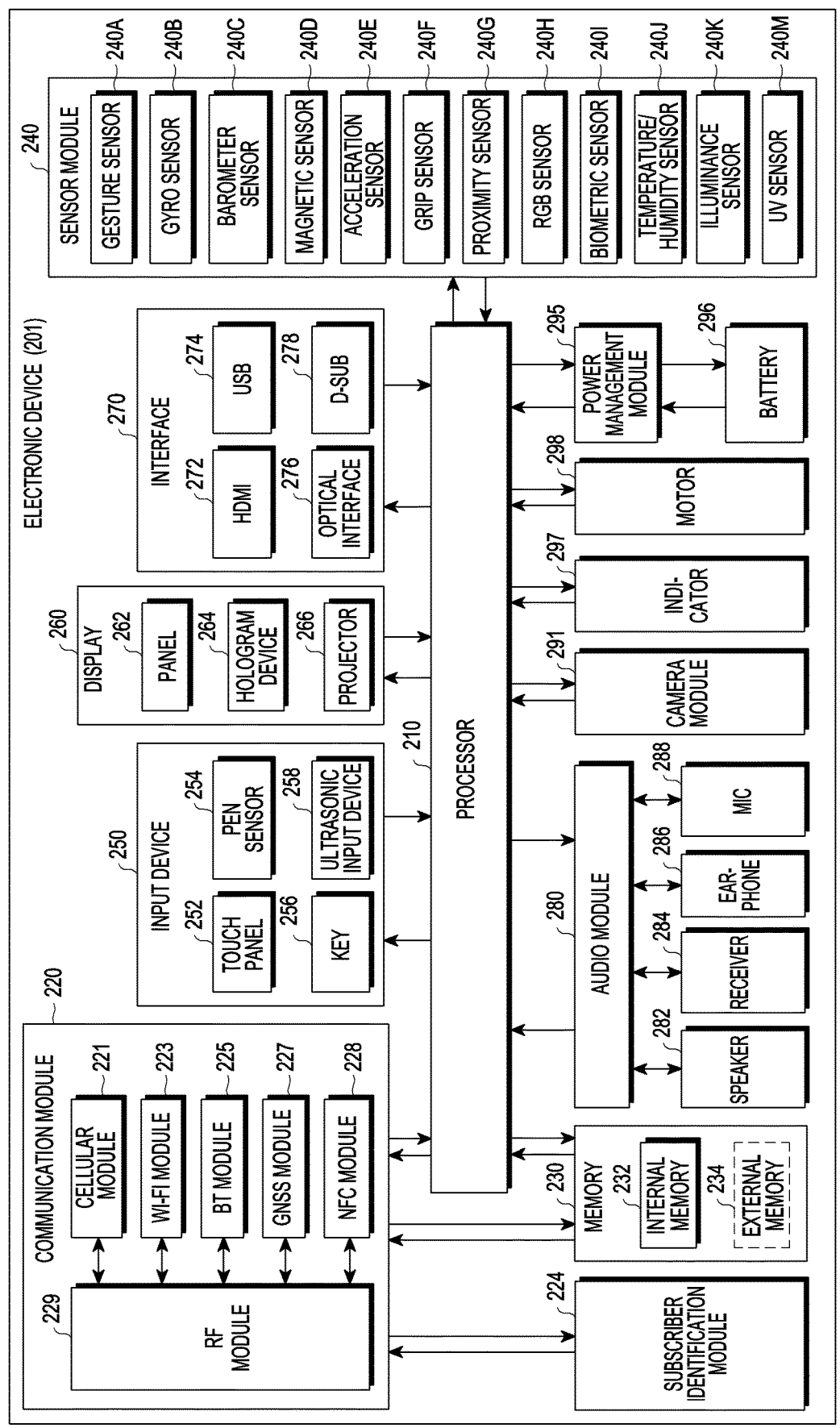
FIG. 2 is a block diagram illustrating an electronic device according to various embodiments.

FIG. 2 is a block diagram illustrating an electronic device 201 according to various embodiments. The electronic device 201 may include, for example, all or some of the components of the electronic device 101 shown in FIG. 1. The electronic device 201 may include one or more processors (e.g., AP) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 296, a battery 296, an indicator 297, and a motor 298.

The processor 210 may include various processing circuitry and drive, for example, an operating system or an application program to control a plurality of hardware or software components connected to the processor 210, may process various data, and may perform operations. The processor 210 may be implemented as, for example, a system on chip (SoC). According to an embodiment, the processor 210 may further include a graphic processing unit (GPU) or an image signal processor. The processor 210 may also include at least some (e.g., a cellular module 221) of the components shown in FIG. 2. The processor 210 may load commands or data received from at least one of other components (e.g., a nonvolatile memory) on a volatile memory, may process the loaded commands or data, and may store the resultant data in a non-volatile memory.

The communication module 220 may include the same or similar configurations as the communication interface 170. For example, the communication module 220 may include various communication circuitry included in various modules, such as, for example, and without limitation, a cellular module 221, a Wi-Fi module 223, a BT module 225, a GNSS module 227, an NFC module 228, and/or an RF module 229, or the like. The cellular module 221 may provide, for example, a voice call, a video call, an SMS service, or an Internet service through a communication network. According to an example embodiment, the cellular module 221 may identify and authenticate the electronic device 201 in a communication network by using an SIM 224 (e.g., a SIM card). According to an example embodiment, the cellular module 221 may perform at least some of the functions provided by the processor 210. According to an example embodiment, the cellular module 221 may also include a communication processor (CP). According to some embodiments, at least some (e.g., two or more) of the cellular module 221, the Wi-Fi module 223, the BT module 225, the GNSS module 227, and the NFC module 228 may be included in one integrated chip (IC) or one IC package. The RF module 229 may transmit/receive, for example, communication signals (e.g., RF signals). The RF module 229 may include a transceiver, a power amp module (PAM), a frequency filter, a low noise amplifier (LNA), an antenna, etc. According to another embodiment, at least one of the cellular module 221, the Wi-Fi module 223, the BT module 225, the GNSS module 227, and the NFC module 228 may transmit/receive RF signals through a separate RF module.

The SIM 224 may include a card including a SIM or an embedded SIM, and may contain unique identification information (e.g., integrated circuit card identifier (ICCID) or subscriber information (e.g., international mobile subscriber identity (IMSI)).

The memory 230 (e.g., the memory 130) may include an internal memory 232 and/or an external memory 234. The internal memory 232 may include at least one of a volatile memory (e.g., a dynamic RAM (DRAM), a static RAM (SRAM), or a synchronous dynamic RAM (SDRAM)) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory, a hard drive, a solid state drive (SSD), or the like). The external memory 234 may include a flash drive, e.g., a compact flash (CF), a secure digital (SD), a Micro-SD, a Mini-SD, an extreme digital (xD), a multi-media card (MMC), a memory stick, or the like. The external memory 234 may be functionally or physically connected to the electronic device 201 through various interfaces.

The sensor module 240 may measure/detect a physical quantity or an operation state of the electronic device 201, and may convert the measured or detected information into an electronic/electrical signal. The sensor module 240 may include at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and/or a ultraviolet (UV) sensor 240M, or the like. Additionally or alternatively, the sensor module 240 may further include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 240 may further include a control circuit for controlling one or more sensors included therein. In some embodiments, the electronic device 201 may include a processor, configured as a part of the processor 210 or a separate component, for controlling the sensor module 240. In this case, while the processor 210 is operating in a sleep mode, the processor 210 may control the sensor module 240.

The input device 250 may include various input circuitry, such as, for example, and without limitation, a touch panel 252, a (digital) pen sensor 254, a key 256, and/or an ultrasonic input device 258, or the like. The touch panel 252 may use at least one of a capacitive touch system, a resistive touch system, an infrared touch system, and an ultrasonic touch system. The touch panel 252 may further include a control circuit. The touch panel 252 may also further include a tactile layer to provide a tactile response to a user. The (digital) pen sensor 254 may be implemented with a part of the touch panel or with a separate recognition sheet. The key 256 may include, for example, a physical button, an optical key, or a keypad. The ultrasonic input device 258 may detect ultrasonic waves, created in an input tool, through a microphone 288, and may identify data corresponding to the detected ultrasonic waves.

The display 260 (e.g., the display 160) may include a panel 262, a hologram unit 264, a projector 266, or a control circuit for controlling them. The panel 262 may include the same or similar configurations as the display 160 shown in FIG. 1. The panel 262 may be configured as one or more modules together with the touch panel 252. According to an example embodiment, the panel 262 may include a pressure sensor (or force sensor) capable of measuring the intensity of pressure on a user's touch. The pressure sensor may be integrated with the touch panel 252 or may be implemented as one or more sensors separate from the touch panel 252. The hologram device 264 may show a stereoscopic image in the air by using light interference. The projector 266 may display an image by projecting light onto a screen. The screen may be located inside or outside of the electronic device 201.

The interface 270 may include various interface circuitry, such as, for example, and without limitation, a HDMI 272, a USB 274, an optical interface 276, and/or a d-subminiature (D-sub) 278, or the like. The interface 270 may be included in the communication interface 170 shown in FIG. 1. Additionally or alternatively, the interface 270 may include a mobile high-definition link (MHL) interface, a SD card/multi-media card (MMC) card interface, or an infrared data association (IrDA) standard interface.

The audio module 280 may bidirectionally convert a sound and an electronic signal. At least some of the components in the audio module 280 may be included in the input/output interface 150 shown in FIG. 1. The audio module 280 may process sound information input or output through a speaker 282, a receiver 284, an earphone 286, a microphone 288, etc. The camera module 291 refers to a device capable of taking both still and moving images. According to an embodiment, the camera module 291 may include one or more image sensors (e.g., a front image sensor or a rear image sensor), a lens, an image signal processor (ISP), a flash (e.g., an LED or xenon lamp), etc. The power management module 295 may manage power of, for example, the electronic device 201. According to an example embodiment, the power management module 295 may include a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge may measure the residual capacity of the battery 296, or a voltage, current, or temperature during charging. The battery 296 may include a rechargeable battery or a solar battery.

The indicator 297 may display a specific status of the electronic device 201 or a part thereof (e.g., the processor 210), e.g., a boot-up status, a message status, a charging status, etc. The motor 298 may convert an electrical signal into mechanical, and may generate a vibration effect, a haptic effect, etc. The electronic device 201 may further include a device (e.g., GPU) for supporting a mobile TV, which is capable of processing media data pursuant to standards, e.g., digital multimedia broadcasting (DMB), digital video broadcasting (DVB), or mediaFlo™, etc. Each of the components described in this document may be composed of one or more components, and the name of the corresponding component may be changed according to the type of the electronic device. According to various embodiments, as to an electronic device (e.g., the electronic device 201), some components thereof may be omitted, additional components may be further included therein, or some of the components may perform the functions of the corresponding components before combination in the same manner while being combined into one entity.

Figure 3:
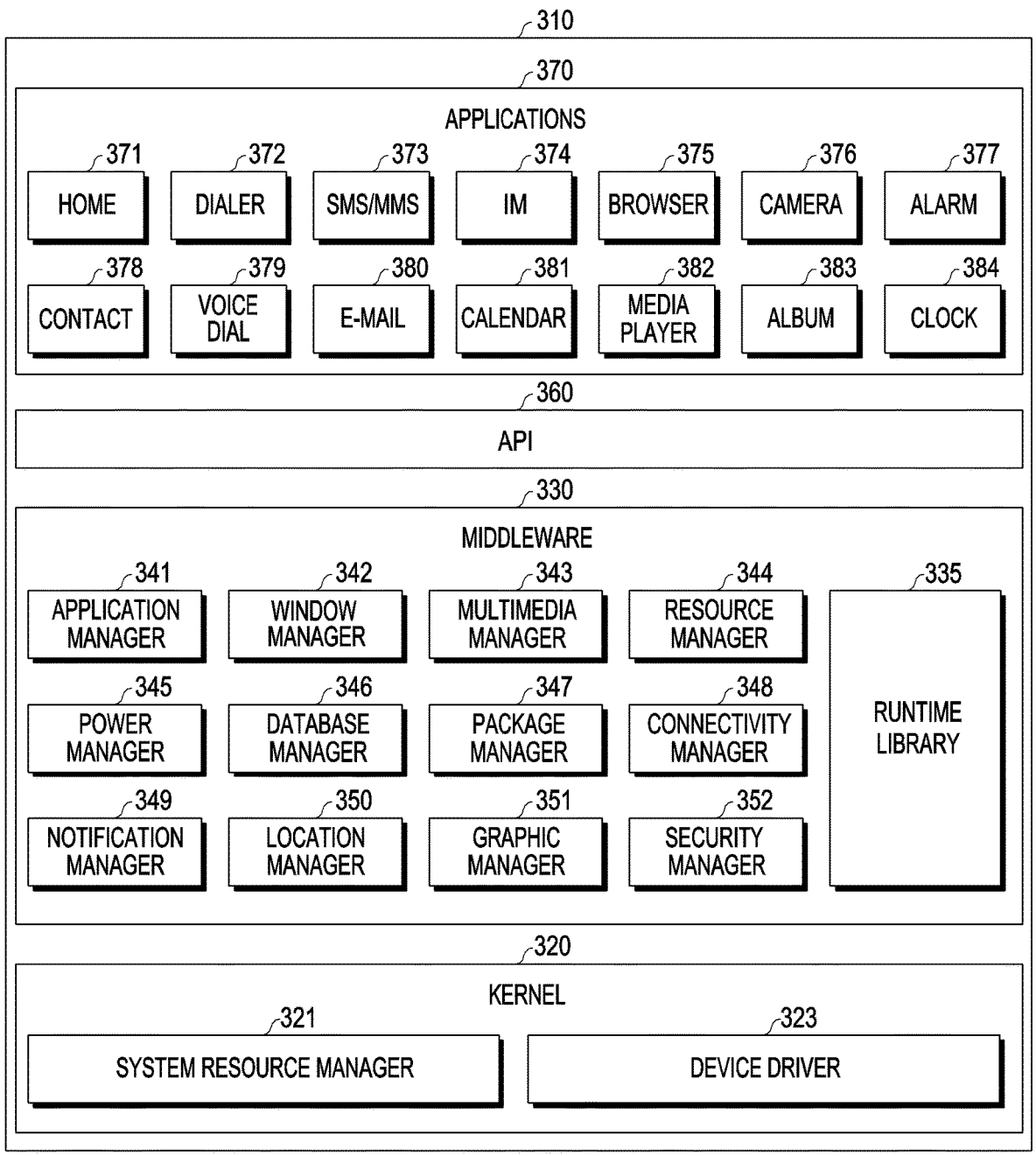
FIG. 3 is a block diagram illustrating a program module according to various embodiments.

FIG. 3 is a block diagram illustrating a program module according to various embodiments. According to an example embodiment, a program module 310 (e.g., the program 140) may include an OS for controlling resources related to the electronic device (e.g., the electronic device 101) or various applications (e.g., the application programs 147) running on the OS. The OS may be, for example, Android™, iOS™, Windows™, Symbian™, Tizen™, Bada™, or the like.

Referring to FIG. 3, the program module 310 may include a kernel 320 (e.g., the kernel 141), a middleware 330 (e.g., the middleware 143), an API 360 (e.g., the API 145), or applications 370 (e.g., the application program 147). At least part of the program module 310 may be preloaded on the electronic device or downloaded from a server (e.g., the electronic device 102 or 104, server 106, etc.).

The kernel 320 may include a system resource manager 321 and/or a device driver 323. The system resource manager 321 may perform a system resource control, allocation, and recall. According to an example embodiment, the system resource manager 321 may include a process management unit, a memory management unit, or a file system management unit. The device driver 323 may include, for example, a display driver, a camera driver, a BT driver, a shared memory driver, a USB driver, a keypad driver, a Wi-Fi driver, an audio driver, or an inter-process communication (IPC) driver.

The middleware 330 may provide a function required in common by the applications 370, or may provide various functions through the API 360 to allow the applications 370 to use limited system resources within the electronic device. According to an example embodiment, the middleware 330 may include at least one of a runtime library 335, an application manager 341, a window manager 342, a multimedia manager 343, a resource manager 344, a power manager 345, a database (DB) manager 346, a package manager 347, a connectivity manager 348, a notification manager 349, a location manager 350, a graphic manager 351, and a security manager 352.

The runtime library 335 may include, for example, a library module used by a complier to add a new function through a programming language while the applications 370 are executed. The runtime library 335 may perform input/output management, memory management, or arithmetic function processing.

The application manager 341 may manage, for example, the life cycle of the applications 370. The window manager 342 may manage GUI resources used on the screen. The multimedia manager 343 may identify a format required for reproducing media files and may perform encoding or decoding of a media file by using a codec suitable for the corresponding format. The resource manager 344 may manage a source code or a space of a memory. The power manager 345 may manage, for example, battery capacity, temperature, or power, and may determine or provide power information that is necessary for the operation of an electronic device using the corresponding information. According to an example embodiment, the power manager 345 may operate together with a basic input/output system (BIOS). The DB manager 346 may generate, retrieve, or change a DB to be used by the applications 370. The package manager 347 may manage an installation or an update of an application distributed in a form of a package file.

The connectivity manager 348 may manage, for example, a wireless connection. The notification manager 349 may provide an event such as an arrival message, an appointment, a proximity alarm or the like to a user. The location manager 350 may manage location information of the electronic device. The graphic manager 351 may manage a graphic effect provided to the user or a user interface related to the graphic effect. The security manager 352 may provide a system security or a user authentication. According to an example embodiment, the middleware 330 may include a telephony manager for managing a voice of the electronic device or a video call function or a middleware module capable of configuring a combination of the functions of the above-described components. According to an example embodiment, the middleware 330 may provide modules specialized according to types of OSs. The middleware 330 may dynamically delete some existing components or add new components. The API 360 may be a set of API programming functions, and may be provided with a different configuration according to an OS. For example, in Android or iOS, a single API set may be provided for each platform. In Tizen, two or more API sets may be provided for each platform.

The applications 370 (e.g., application programs 147) may include applications, e.g., home 371, dialer 372, SMS/MMS 373, instant message (IM) 374, browser 375, camera 376, alarm 377, contact 378, voice dial 379, email 380, calendar 381, media player 382, album 383, clock 384, or the like. Additionally, though not shown, the applications 370 may also include various other applications, such as, for example, and without limitation, health care (e.g., an application for measuring amount of exercise, blood sugar level, etc.), and environment information (e.g., an application for providing atmospheric pressure, humidity, temperature, etc.).

According to an example embodiment, the applications 370 may include an information exchange application for supporting information exchange between an electronic device and an external device. The information exchange application may include a notification relay application for relaying specific information to, for example, an external electronic device, or a device management application for managing the external electronic device. For example, the notification relay application may relay notification information, created in other applications of the electronic device, to the external electronic device, or may receive notification information from the external electronic device to provide the received information to a user. The device management application may install, delete, or update functions (e.g., turning-on/turning-off the external electronic device itself (or some components thereof) or adjusting the brightness (or resolution) of a display), or applications operated in the external electronic device. According to an example embodiment, the applications 370 may include an application (e.g., a health care application of a mobile medical device, etc.) specified attributes of an external electronic device. According to an example embodiment, the applications 370 may include applications received from an external electronic device. At least some of the program modules 310 may be implemented (e.g., executed) in software, firmware, hardware (e.g., the processor 210), or a combination of at least two of the same, and may include modules, programs, routines, instruction sets or processes for performing one or more functions.

Figure 4A:
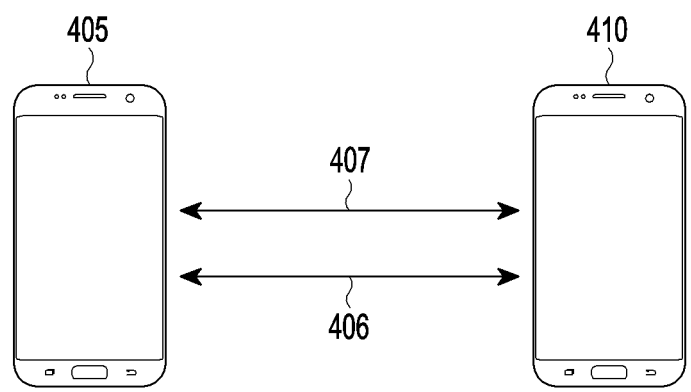
FIG. 4A is a diagram illustrating an example in which an electronic device and an external electronic device are connected to each other via a dual role according to various embodiments.

FIG. 4A is a diagram illustrating a case in which an electronic device and an external electronic device are connected to each other via a dual role according to an embodiment.

At least one of an electronic device 405 and an external electronic device 410 may include at least one component of the electronic device 101 of FIG. 1 or the electronic device 201 of FIG. 2, and may perform at least one function or operation.

Referring to FIG. 4A, the electronic device 405 (e.g., the electronic device 101 of FIG. 1 or the electronic device 201 of FIG. 2) according to various embodiments and the external electronic device 410 (e.g., the external electronic device 102 of FIG. 1) may perform short-range communication based on at least one of a first connection 406 and a second connection 407. According to an example embodiment, the electronic device 405 and the external electronic device 410 may simultaneously perform communication using the first connection 406 based on a wired manner and the second connection 407 based on a wireless manner. As another example, the electronic device 405 and the external electronic device 410 may perform communication using the first connection 406 and the second connection 407 based on the wireless manner. As another example, the electronic device 405 and the external electronic device 410 may perform communication using the first connection 406 based on a wireless manner and the second connection 407 based on a wired manner.

According to various embodiments, in USB communication, a connection between devices (e.g., the electronic device 405 and the external electronic device 410) may be performed using a USB cable to perform data communication such as file sharing or the like. In the USB communication, one device may be a host and the other device may be a device (or client). When the electronic device 405 is connected to the external electronic device 410 through a USB cable, one may operate as a host (host controller). For example, an electronic device such as a PC may serve as a host when USB communication is performed with another electronic device. A device is a target of the USB communication. The USB communication is a communication between a subject (host controller) and a target (device). A plurality of devices may be connected to one host controller to perform communication.

According to various embodiments, a Wi-Fi serial bus (WSB) may use a Wi-Fi interface to connect communication between devices (e.g., the electronic device 405 and the external electronic device 410) and may utilize USB services using existing USB technology. For example, a device providing WSB services may implement a media agnostic USB (MA USB) protocol and may specify functions required for the operation of MA USB via Wi-Fi. The MA USB protocol may be a protocol that configures a virtual USB environment between remote locations using a wireless or IP link while making maximum use of an existing USB bus facility environment that is configured in a wired manner designated by a USB interface.

According to various embodiments, the electronic device 405 and the external electronic device 410 may support a host role and a device role in a USB role. The electronic device performing the host role may change data to a predetermined form and may transmit the data to another connected electronic device or may control another electronic device. The device role may receive data from the electronic device may receive data from the electronic device that performs the host role, and may be operated by a request of the electronic device that performs the host role. According to an example embodiment, when the electronic device 405 is connected to the external electronic device 401, the electronic device 405 may operate as the host role to detect the speed supported by the external electronic device 410 that operates as the device role, and may perform a reset operation with respect to the external electronic device 410. The electronic device 405 may assign a new address to the external electronic device 410 after the reset operation is completed. The electronic device 405 may perform a setup operation of the external electronic device 410, and may read a descriptor held by the external electronic device 410 to determine the characteristics thereof, and then may perform the setup operation. When the electronic device 405 and the external electronic device 410 are connected, a management packet, a control packet, and a data packet may be transmitted and received. The management packet is a packet for managing a link, which is related to link creation, removal, device enumeration, bus power management, and the like. The control packet is a packet used for USB control transmission and the data packet is a packet used for simply transmitting the data packet.

According to an example embodiment, the electronic device 405 and the external electronic device 410 may support the host role and the device role in WSB communication. The WSB host may perform a MA USB host function and may enable a Wi-Fi connection to at least one of a WSB peripheral device or a WSB hub. The WSB device role is a role in a device having the functionality of the WSB hub or the WSB peripheral device. The WSB hub is a WSB hub device that performs a MA USB hub function and enables a Wi-Fi connection to the WSB host, and a wireless downstream connection of the WSB hub may be out of range of the WSB. The WSB peripheral device may perform a MA USB device function and enable a Wi-Fi connection to the WSB host.

According to various embodiments, the electronic device 405 or the external electronic device 410 may establish at least one communication connection using USB or WSB. According to an example embodiment, when the electronic device 405 and the external electronic device 410 are connected in a first communication, one of the electronic device 405 and the external electronic device 410 may be designated with a host role, and the other thereof may be designated with a device role. When a second communication is performed while the first communication between the electronic device 405 and the external electronic device 410 is performed, a role different from the role specified by the first communication may be additionally designated. When the first communication connection between the electronic device 405 and the external electronic device 410 is performed using a USB communication method or a WSB communication method, the USB role may be set for the electronic device 405 and the external electronic device 410. For example, when the electronic device 405 is set as a USB host role, the external electronic device 410 may be set as a USB device role. When an event associated with the second communication connection is detected while the first communication connection between the electronic device 405 and the external electronic device 410 is performed, the second communication therebetween may be performed using the USB communication and the WSB communication. In this case, the second communication connection between the electronic device 405 and the external electronic device 410 may be performed with a role opposite the USB role in the first communication connection.

According to various embodiments, when a wired communication connection and a wireless communication connection is established between the electronic device 405 and the external electronic device 410, the electronic device 405 may operate as a host role based on a wired connection (e.g., a USB connection) to perform wired communication with the external electronic device 410, and may operates as a device role based on a wireless connection (e.g., a WSB connection) to establish wireless communication with the external electronic device 410. According to another embodiment, when a wired communication connection and a wireless communication connection are established between the electronic device 405 and the external electronic device 410, the electronic device 405 may operate as a device role based on a wired connection to perform wireless communication with the external electronic device 410, and may operate as a host role based on a wireless connection to perform wireless communication with the external electronic device 410.

According to various embodiments, the electronic device 405 and the external electronic device 410 may simultaneously transmit and receive data or control signals through the wired connection and the wireless connection. Thereby, a user can control the external electronic device 410 in the electronic device 405 or the electronic device 405 in the external electronic device 410.

Figure 4B:
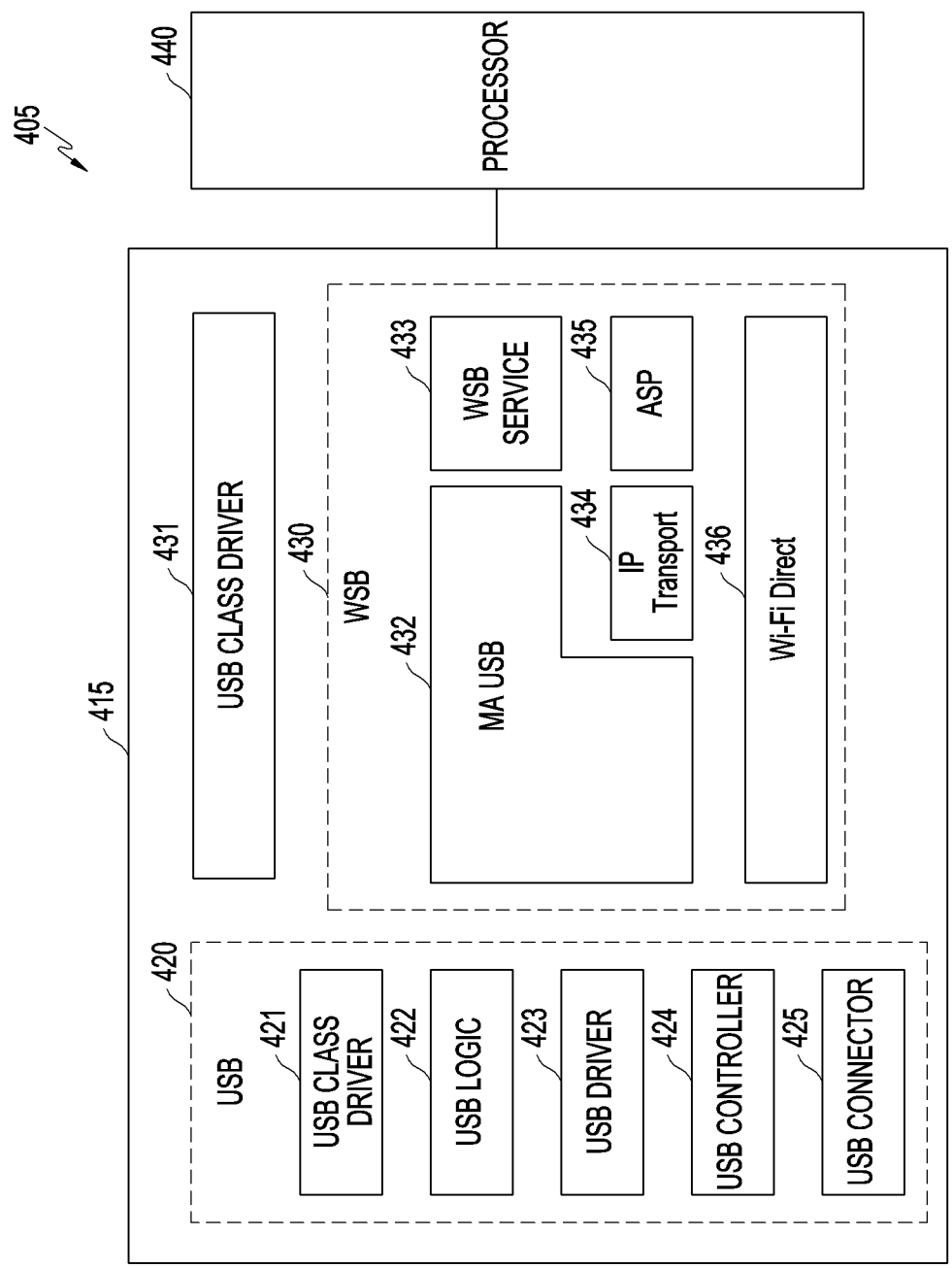
FIG. 4B is a block diagram illustrating an electronic device that supports universal serial bus (USB) communication and (Wi-Fi serial bus) WSB communication according to various embodiments.

FIG. 4B is a block diagram illustrating an electronic device that supports USB communication and WSB communication according to various embodiments.

Referring to FIG. 4B, the communication interface (e.g., including communication interface circuitry) 415 of the electronic device 405 according to various embodiments may, for example, and without limitation, support a wired connection via a USB cable and a wireless connection via Wi-Fi communication (e.g., Wi-Fi direct). The communication interface 415 of the electronic device 405 may include a USB communication interface (e.g., including USB communication interface circuitry) 420, a WSB communication interface (e.g., including WSB communication interface circuitry) 430, and a USB class driver component (e.g., including USB class driver circuitry) 431. The communication interface 415 of the electronic device 405 may perform at least one function or operation performed in the communication interface 170 of the electronic device 101 in FIG. 1. The processor (e.g., including processing circuitry) 440 may perform at least one function or operation performed in the processor 120 of the electronic device 101 in FIG. 1. The USB communication interface 420 of the communication interface 415 may provide a first communication with the external electronic device 410 via a USB cable, and may include a USB class driver component 421, a USB logic component 422, a USB driver component 423, a USB controller component 424, and a USB connector component 425, each of which may include various circuitry and/or program elements. The WSB communication interface 430 of the communication interface 415 may include a MA USB component 432, a WSB service component 433, an Internet protocol (IP) transport component 434, an application service provider (ASP) component 435, and a Wi-Fi direct component 436, each of which may include various circuitry and/or program elements. The WSB communication interface 430 may provide a second communication with the external electronic device 410 via the Wi-Fi direct component 436.

According to an example embodiment, the USB class driver component 431 may, for example, and without limitation, be a device driver configured to operate various USB devices sharing a USB protocol. According to an example embodiment, the communication interface 415 may include, for example, and without limitation, the USB class driver component 431 and the USB class driver component 421 of the USB communication interface 420 as separate components or one component.

According to an example embodiment, the MA USB (MA) component 432 may perform USB device enumeration and USB data transfer using the MA USB protocol after an ASP session.

According to an example embodiment, the WSB service component 433 may operate at the top of the ASP component 435, and may interact with the ASP component 435 to perform service discovery and connection setup for a WSB service. The WSB service component 433 and the ASP component 435 may exchange primitives and events for service discovery and connection setup via a communication path. For example, the WSB service component 433 may specify a transmission mode of the MA USB protocol during each WSB session of the WSB service.

According to an example embodiment, the IP transport component 434 may be connected to the MA USB component 432 based on an IP.

According to an example embodiment, the ASP component 435 may implement common functions used by services and applications which are operated through the Wi-Fi direct component 436 or other wireless connections.

According to an example embodiment, the Wi-Fi direct component 436 may establish a communication connection between electronic devices (e.g., the electronic device 101 (e.g., the electronic device 405 of FIG. 4A) and the external electronic device 102 (e.g., the external electronic device 410 of FIG. 4A)) which support a WSB communication connection via a wireless network. For example, the Wi-Fi direct component 436 may generate a P2P group (e.g., a Wi-Fi direct group) and may perform a wireless connection between a GO terminal and a GC terminal of the generated P2P group. In the P2P connection, the GO and the GC may be connected to each other in a data link layer within a Wi-Fi P2P group, that is, an MAC layer. As another example, a tunneled direct link setup (TDLS) component configured to set a direct link between devices supporting WSB services, and a Wi-Fi component may be further included.

According to an example embodiment, the electronic device 405 may establish a first communication connection with the external electronic device 410 via the USB communication interface 420. The electronic device 405 may communicate with the external electronic device 410 based on the first communication. According to an example embodiment, when a wireless connection based on the WSB communication interface 430 is detected during wired communication with the external electronic device 410 via the USB communication interface 420, the electronic device 405 may identify a role by the wired communication. In addition, the electronic device 405 may perform wireless communication with the external electronic device 410 through a role different from the role identified in the wired communication.

According to an example embodiment, when the electronic device 405 is connected to the external electronic device 410 via the USB cable, the electronic device 405 may activate the USB class driver component 421 capable of performing a host role based on the USB connection. The electronic device 405 may activate the USB controller component 424, the USB driver 423, and the USB logic component 422 when the external electronic device 410 is connected to the USB connector component 425. The electronic device 405 may activate the USB class driver component 421 suitable for the external electronic device 410 according to the recognition result of the external electronic device 410.

According to an example embodiment, when a request to perform a second communication connection with the external electronic device 410 through WSB communication including a Wi-Fi direct connection while a first communication connection is wiredly performed between the electronic device 405 and the external electronic device 410 through the USB cable so that the electronic device 405 operates as a host role, the electronic device 405 may perform an operation of identifying a role based on the first communication. According to an example embodiment, the identification of the role may be performed at the time the first communication connection is wiredly performed through the USB cable. The electronic device 405 may perform wireless communication with the external electronic device 410 via the WSB based on via a role different from the identified role. For example, when P2P communication with the external electronic device 410 is performed at an MAC layer via the Wi-Fi direct component 436 of the electronic device 405, the WSB service component 433 and the ASP component 435 may perform service discovery and connection session setup of the external electronic device 410. As another example, the WSB service component 433 and the ASP component 435 perform service discovery and connection session setup of the external electronic device 410, and then P2P communication with the external electronic device 410 may be made at the MAC layer via the Wi-Fi direct component 436 of the electronic device 405. After an ASP session connection with the external electronic device 410, the MA USB 432 of the electronic device 405 may perform USB device enumeration and USB data transfer using the MA USB protocol. Accordingly, the USB class driver component 431 suitable for the external electronic device 410 can be activated. In FIG. 4B, the electronic device 405 operates, for example, and without limitation, as the host role through the wired connection based on USB and as the device role through the wireless connection based on WSB including the Wi-Fi direct connection. However, according to an example embodiment, the electronic device 405 can additionally operate as the device role through the wired connection based on USB while operating as the host role through the wireless connection based on the WSB including a Wi-Fi Direct connection. According to an example embodiment, when the electronic device is designated with the host role through the wired connection based on USB while operating as the host role through the wireless connection based on WSB including the Wi-Fi direction connection, the host role in the WSB may be changed to the device role. In FIG. 4B, the USB class driver component 421 and the USB class driver component 430 of the USB communication interface 420 are shown to be separated from each other, but they may be configured as one. The USB class driver component 421 and the USB class driver component 430 may be configured as one piece of software or may be separately configured. According to an example embodiment, at least one of the electronic device 405 and the external electronic device 410 may include both the USB communication interface 420 and the WSB communication interface 430, or may include either the USB communication interface 420 or the WSB communication interface 430.

FIGS. 5A, 5B, 5C and 5D are diagrams illustrating a case in which an electronic device (e.g., the electronic device 405 of FIG. 4A) and an external electronic device (e.g., the external electronic device 410 of FIG. 4A) perform a communication connection based on at least one of a first connection and a second connection according to various embodiments. The electronic device according to various embodiments may perform communication with the external electronic device based on at least one of a wired manner or a wireless manner.

Figure 5A:
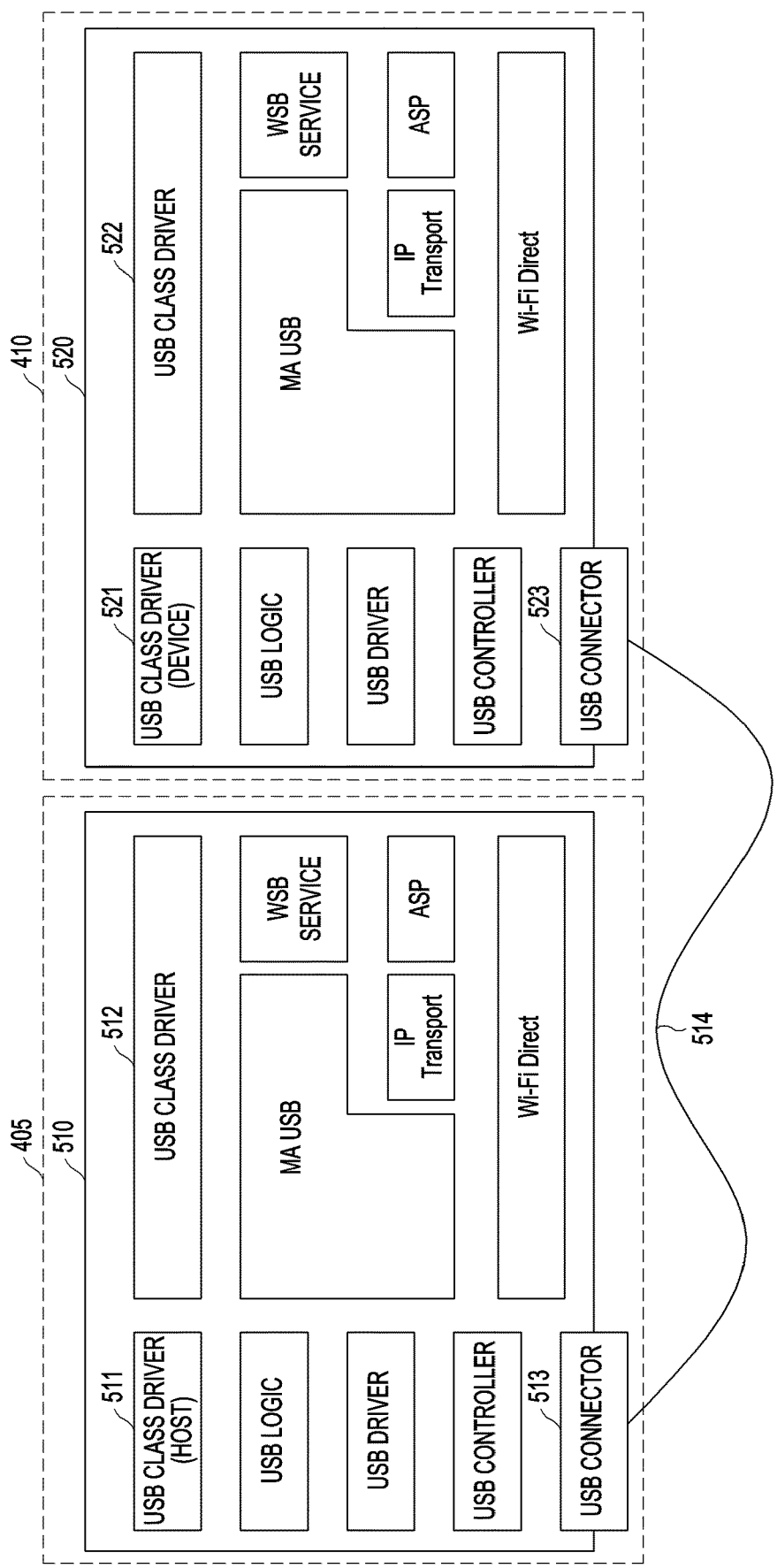
FIG. 5A is a diagram illustrating a case in which an electronic device and an external electronic device are connected to each other via a USB cable according to various embodiments.

FIG. 5A illustrates a case in which an electronic device according to various embodiments and an external electronic device are connected to each other via a USB cable.

Referring to FIG. 5A, a communication interface (e.g., including communication circuitry) 510 of the electronic device (e.g., the electronic device 405 of FIG. 4A) and a communication interface (e.g., including communication circuitry) 520 of the external electronic device (e.g., the external electronic device 410 of FIG. 4A) may be connected by wire to each other via a USB cable 514. A USB connector component 513 of the communication interface 510 of the electronic device 405 and a USB connector component 523 of the communication interface 520 of the external electronic device 410 may be connected to each other via the USB cable 514. When the electronic device 405 is connected to the external electronic device 410 via the USB cable 514 and is determined as a host, a USB class driver component 511 of the communication interface 510 may operate as a host role. When the external electronic device 520 is connected to the electronic device 510 via the USB cable 514 and is determined as a device, the USB class driver component 521 of the communication interface 520 may operate as a device role.

Figure 5B:
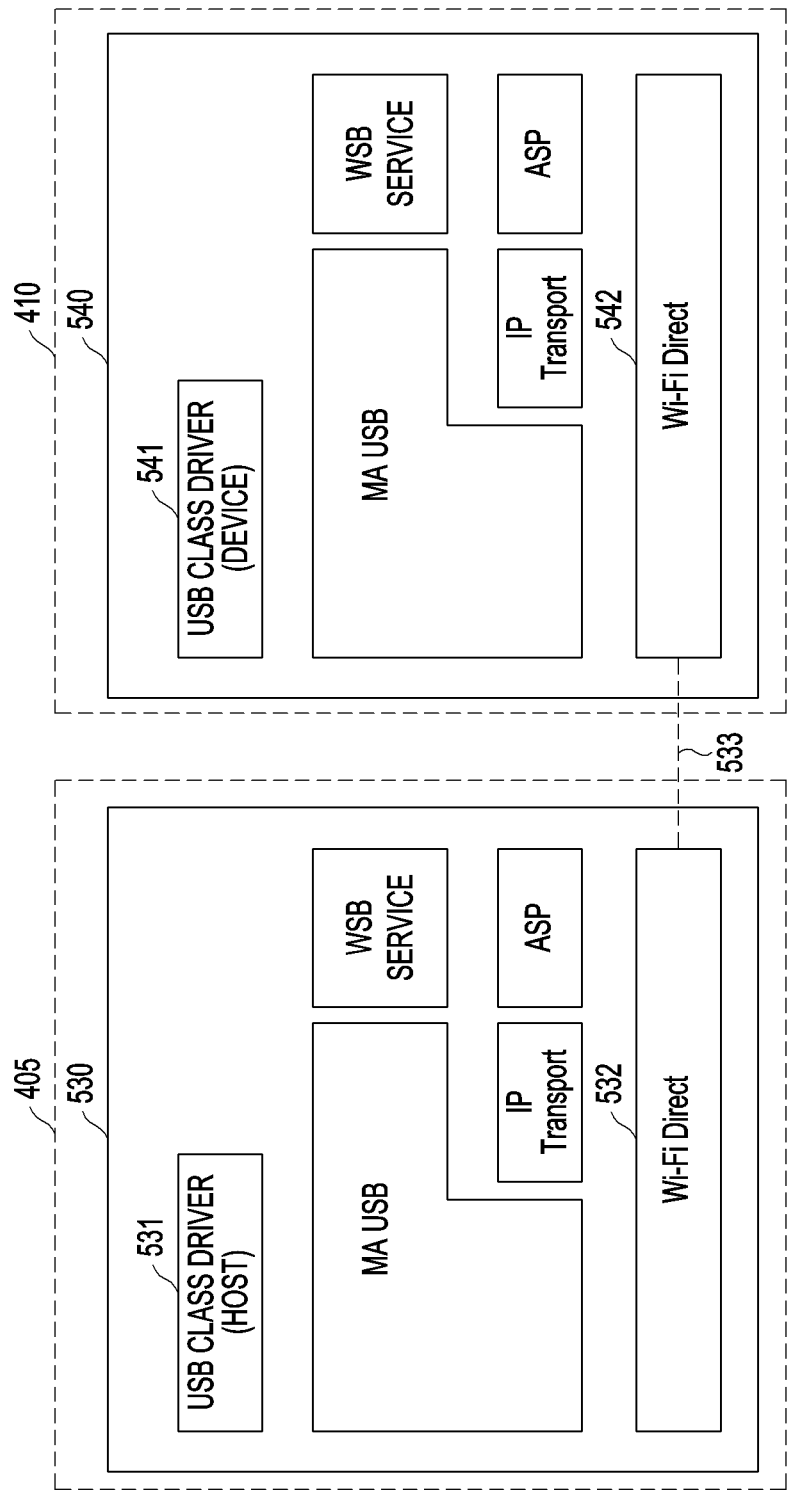
FIG. 5B is a diagram illustrating a case in which an electronic device and an external electronic device are connected to each other via a WSB according to various embodiments.

FIG. 5B is a diagram illustrating a case in which an electronic device and an external electronic device are connected to each other via a WSB according to various embodiments.

Referring to FIG. 5B, a communication interface 530 of the electronic device (e.g., the electronic device 405 of FIG. 4A) and a communication interface 540 of the external electronic device (e.g., the external electronic device 410 of FIG. 4A) may be wirelessly connected to each other via a WSB 533. The electronic device 405 and the external electronic device 410 may perform a WSB 533 communication connection through a Wi-Fi direct component 532 of the communication interface 530 of the electronic device 405 and a Wi-Fi direct component 542 of the communication interface 540 of the external electronic device 410. According to an example embodiment, when the WSB 533 communication connection is performed via the Wi-Fi direct component 532 of the communication interface 530 and the Wi-Fi direct component 542 of the communication interface 540, the electronic device 405 and the external electronic device 410 may operate as either a USB host role or a USB device role. For example, the USB class driver component 531 of the communication interface 530 of the electronic device 405 may operate as the host role and the USB class driver component 541 of the communication interface 540 of the external electronic device 410 may operate as the device role. As another example, the USB class driver component 531 of the electronic device 405 may operate as the device role, and the USB class driver component 541 of the external electronic device 410 may operate as the host role.

Figure 5C:
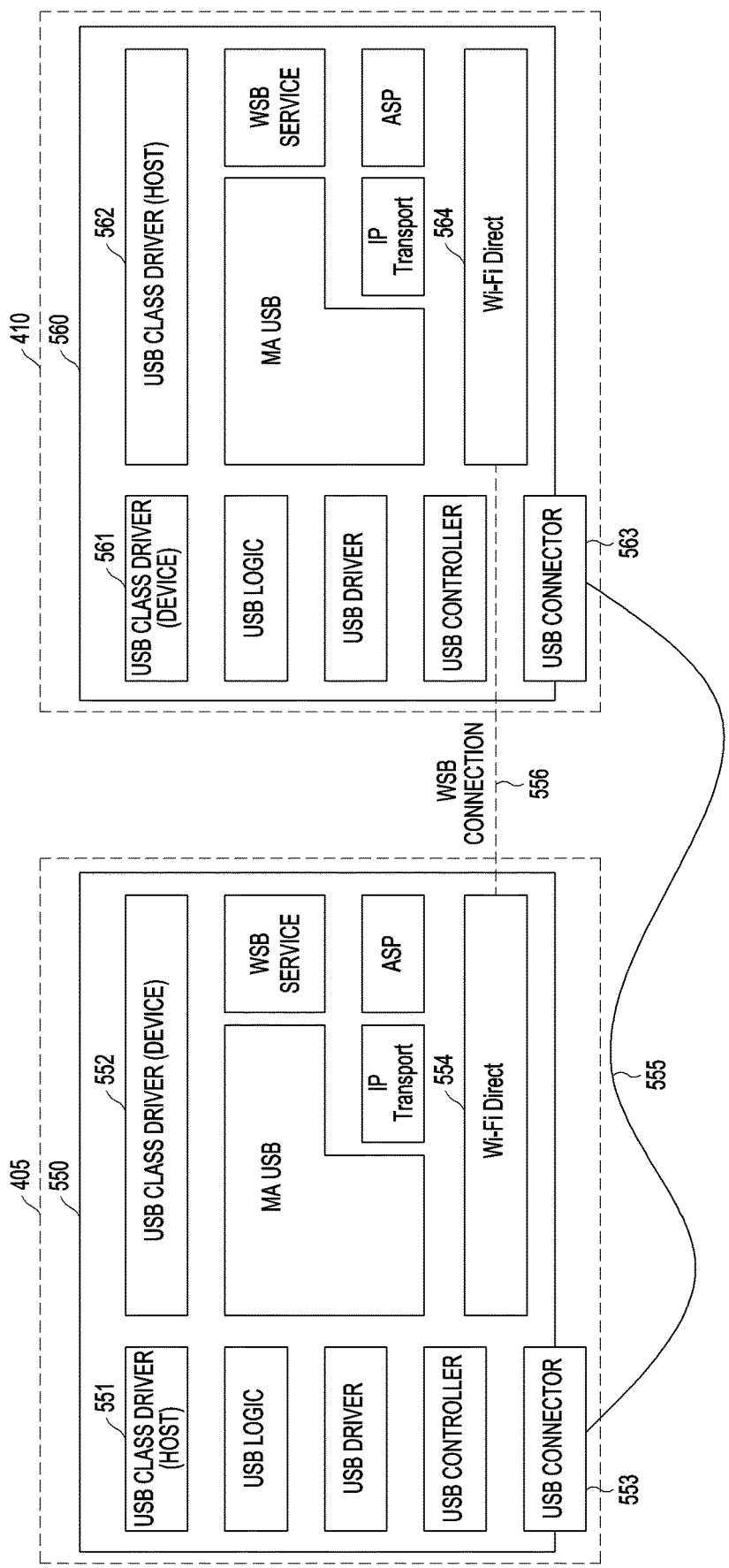
FIG. 5C is a diagram illustrating a case in which an electronic device and an external electronic device are connected to each other via a USB cable and a WSB according to various embodiments.

FIG. 5C is a diagram illustrating a case in which an electronic device and an external electronic device are connected to each other via a USB cable and a WSB according to various embodiments.

Referring to FIG. 5C, the USB connector component 553 of the communication interface 550 of the electronic device (e.g., the electronic device 405 of FIG. 4A) and the USB connector component 563 of the communication interface 560 of the external electronic device (the external electronic device 410 of FIG. 4A) may be connected to each other via a USB cable in a wired manner 555, and a Wi-Fi direct component 554 of the electronic device 405 and a Wi-Fi direct component 564 of the external electronic device 410 may be connected to each other via WSB communication 556 in a wireless manner. According to an example embodiment, after a USB communication connection 555 is established through the wired connection between the USB connector component 553 of the electronic device 405 and the USB connector component 563 of the external electronic device 410, a WSB communication connection 556 may be established through the wireless connection between the Wi-Fi direct component 554 of the electronic device 405 and the Wi-Fi direct component 564 of the external electronic device 410. According to another embodiment, after a WSB communication connection 556 is established through the wireless connection between the Wi-Fi direction component 554 of the electronic device 405 and the Wi-Fi direction component 564 of the external electronic device 410, the USB communication connection 555 may be established through the wired connection between the USB connector component 553 of the electronic device 405 and the USB connector component 563 of the external electronic device 410. When the electronic device 405 is wirelessly connected to the external electronic device 410 via the WSB connection 556 while the electronic device 405 is connected to the external electronic device 410 via the USB cable 555 and the USB class driver 551 of the electronic device 405 operates as a host role, the USB class driver component 552 of the electronic device 405 may operate as a device role. When the external electronic device 410 is wirelessly connected to the electronic device 405 via the WSB connection 556 while the external electronic device 410 is connected to the electronic device 405 via the USB cable 555 and the USB class driver 561 of the external electronic device 410 operates as a device role, the USB class driver component 562 of the external electronic device 410 may operate as a host role. Although, in the above description, a case in which the electronic device 405 and the external electronic device 410 are connected to each other via the USB cable 555 and then connected to each other via the WSB connection 556 has been described, the present disclosure may also be applied to a case in which the electronic device 405 and the external electronic device 410 are connected to each other via the WSB connection 556 and then connected to each other via the USB cable 555. In the above description, although the USB class drivers 551 and 552 of the electronic device 405 and the USB class drivers 561 and 562 of the external electronic device 410 are shown as being separated from each other, this is merely an example, and at least one of the USB class drivers 551 and 552 of the electronic device 405 and the USB class drivers 561 and 562 of the external electronic device 410 may be included in one component.

Figure 5D:
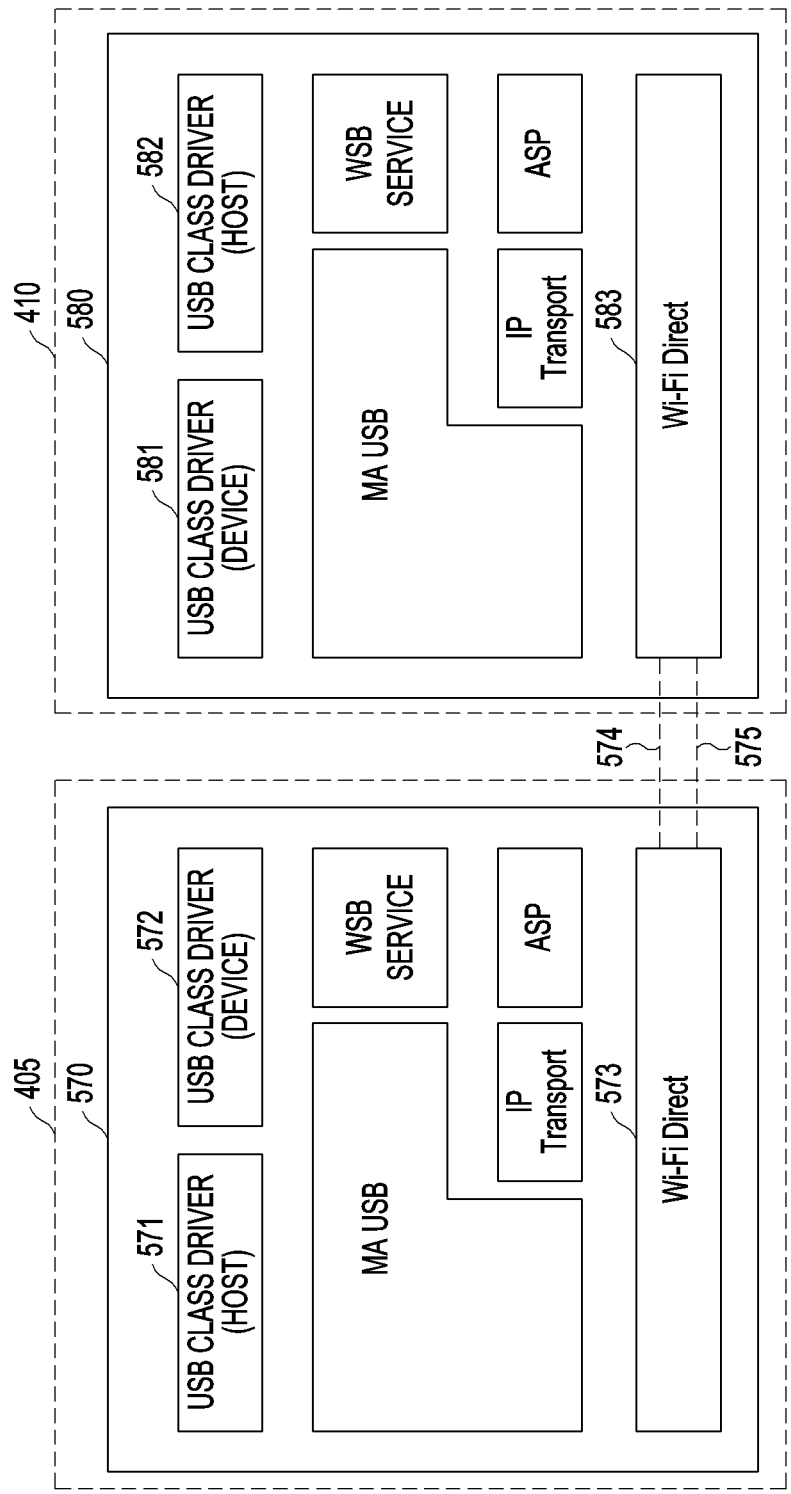
FIG. 5D is a diagram illustrating a case in which an electronic device and an external electronic device are connected to each other via a first WSB and a second WSB according to various embodiments.

FIG. 5D is a diagram illustrating a case in which an electronic device and an external electronic device are connected to each other via a first WSB and a second WSB according to various embodiments.

Referring to FIG. 5D, a communication interface 570 of an electronic device (e.g., the electronic device 405 of FIG. 4A) and a communication interface 580 of an external electronic device (e.g., the electronic device 410 of FIG. 4A) may perform communication through a plurality of wireless connections based on a WSB. The electronic device 405 and the external electronic device 410 may be wirelessly connected via the first wireless connection 574 of the WSB and the second wireless connection 575 of the WSB. The first wireless connection 574 and the second wireless connection 575 may be set up through the Wi-Fi direct component 573 of the electronic device 405 and the Wi-Fi direct component 583 of the external electronic device 410. According to an example embodiment, in a state in which the Wi-Fi direct component 573 of the electronic device 405 and the Wi-Fi direct component 583 of the external electronic device 410 are connected via the first wireless connection 574, the second wireless connection 575 may be set up through the Wi-Fi direct component 573 of the electronic device 405 and the Wi-Fi direct component 583 of the external electronic device 410.

According to various embodiment, when the first WSB communication 574 and the second WSB communication 575 between the electronic device 405 and the external electronic device 410 are established through the Wi-Fi direct components 573 and 583, the electronic device 405 and the external electronic device 410 may simultaneously operate as a USB host role and a USB device role. For example, when the Wi-Fi direct component 573 of the electronic device 405 and the Wi-Fi direct component 583 of the external electronic device 410 are connected via the first wireless connection 574, a first USB class driver component 571 of the electronic device 405 may operate as a host role and a first USB class driver component 581 of the external electronic device 410 may operate as a device role. According to an example embodiment, when the Wi-Fi direct component 573 of the electronic device 405 and the Wi-Fi direct component 583 of the external electronic device 410 are connected through the first wireless connection 574, the first USB class driver component 571 of the electronic device 405 may operate as a device role and the first USB class driver component 581 of the external electronic device 410 may operate as a host role.

According to various embodiments, when the Wi-Fi direct component 573 of the electronic device 405 and the Wi-Fi direct component 583 of the external electronic device 410 are connected via the first WSB communication 574 so that the electronic device 405 operates as a host role, the electronic device 405 may operate as a device role in the second WSB communication 575 connected through the Wi-Fi direct component 573 of the electronic device 405 and the Wi-Fi direct component 583 of the external electronic device 410. According to an example embodiment, when the electronic device 405 is connected to the external electronic device 410 via the second wireless connection 575 while the electronic device 405 is connected to the external electronic device 410 via the first wireless connection 574 so that the first USB class driver component 571 of the electronic device 405 operates as a host role, a second USB class driver component 572 of the electronic device 405 may operate as a device role. According to an example embodiment, when the external electronic device 410 is connected to the electronic device 405 via the second wireless connection 575 while the external electronic device 410 is connected to the electronic device 405 via the first wireless connection 574 so that the first USB class driver component 581 of the external electronic device 410 operates as a device role, a second USB class driver component 582 of the external electronic device 410 may operate as a host role. The first USB class driver component 571 and the second USB class driver component 572 of the electronic device 405 may be configured as a single module, and the first USB class driver component 581 and the second USB class driver component 582 of the external electronic device 410 may be configured as a single module. As described above, the electronic device (e.g., electronic device 405 of FIG. 4A) and the external electronic device (e.g., external electronic device 410 of FIG. 4A) may perform dual role where they simultaneously operate as a host role and a device role through the respective Wi-Fi direct components 573 and 583. In the above description, although the USB class drivers (e.g., the USB class drivers 571 and 572 of the electronic device 405 and the USB class drivers 581 and 582 of the external electronic device 410) of the electronic device 405 and the external electronic device 410 are shown as being separated from each other, this is merely an example, and the USB class drivers (e.g., the USB class drivers 571 and 572 of the electronic device 405 and the USB class drivers 581 and 582 of the external electronic device 410) of the electronic device 405 and the external electronic device 410 may be included in one component.

Figure 6:
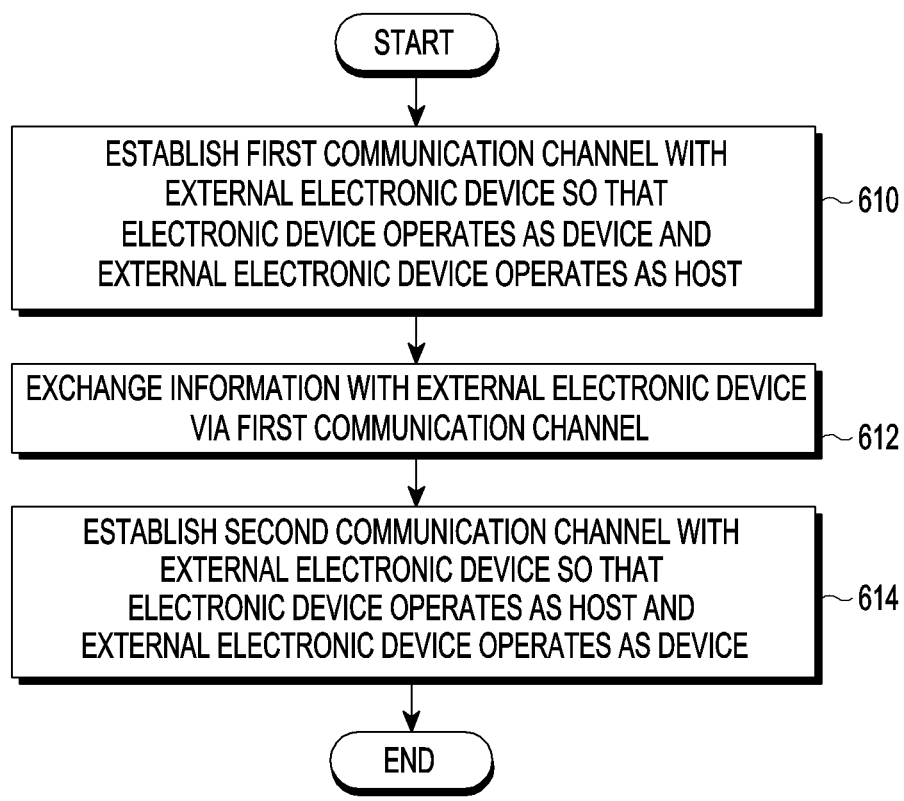
FIG. 6 is a flowchart illustrating an operation in which an electronic device communicates with an external electronic device according to various embodiments.

FIG. 6 is a flowchart illustrating an operation in which an electronic device communicates with an external electronic device according to various embodiments.

Hereinafter, an operation in which an electronic device according to various embodiments communicates with an external electronic device will be described in greater detail with reference to FIG. 6.

According to various embodiments, in operation 610, an electronic device (e.g., via the processor 120) may establish a first communication channel with an external electronic device (e.g., the external electronic device 102 of FIG. 1) so that an electronic device (the electronic device 101 of FIG. 1) operates as a device and the external electronic device operates as a host. For example, the electronic device (e.g., the processor 120) may perform a first communication connecting operation with the external electronic device 102 through a USB or WSB communication method. According to an example embodiment, the first communication channel is established between the electronic device 101 (e.g., the processor 120) and the external electronic device (e.g., the external electronic device 102 of FIG. 1) so that the electronic device 101 may operate as a device and the external electronic device (e.g., the external electronic device 102 of FIG. 1) may operate as a host. For example, when the first communication channel between the electronic device 101 (e.g., the processor 120) and the external electronic device (e.g., the external electronic device 102 of FIG. 1) is established based on a wired communication interface (e.g., the USB connectors 513 or 523 of FIG. 5A), the electronic device 101 (e.g., the processor 120) may operate as a device, and the external electronic device (e.g., the external electronic device 102 of FIG. 1) may operate as a host. The wired communication interface may include a USB interface. As another example, when the first communication channel between the electronic device 101 (e.g., the processor 120) and the external electronic device (e.g., the external electronic device 102 of FIG. 1) is established based on a wireless communication circuit (e.g., the Wi-Fi direct components 532 or 542), the electronic device 101 (e.g., the processor 120) may operate as a device, and the external electronic device (e.g., the external electronic device 102 of FIG. 1) may operate as a host. The wireless communication circuit may support a wireless connection (e.g., WSB).

According to various embodiments, when the first communication is performed, at least one of the electronic device 101 (e.g., the processor 120) and the external electronic device 102, it may be determined whether each of the electronic device 101 (e.g., the processor 120) and the external electronic device 102 operates as a host or a device. For example, in a case in which the electronic device 101 and the external electronic device 102 are connected to each other based on a USB Type C, it may be recognized as a host when Rd resistance is recognized on a CC pin included in the USB interface (e.g., the USB connector) of the electronic device 101 (e.g., the processor 120), and it may be recognized as a device when Rp resistance is recognized.

According to various embodiments, in operation 612, the electronic device 101 (e.g., the processor 120) may exchange information with the external electronic device 102 via the first communication channel. According to an example embodiment, the first communication is performed between the electronic device 101 (e.g., the processor 120) and the external electronic device 102 via a wired communication interface (e.g., the USB connector 513 or 523 of FIG. 5A), the electronic device (e.g., the processor 120) may exchange at least one of a peer to peer (P2P) address, a role of the electronic device 101, and capability of WSB with the external electronic device 102 based on the performed first communication.

According to an example embodiment, when the first communication is performed between the electronic device 101 (e.g., the processor 120) and the external electronic device 102 via a wireless communication circuit (e.g., the Wi-Fi direct components 532 or 542 of FIG. 5B), the electronic device (e.g., the processor 120) may exchange at least one of an advertisement identifier for second communication that can be performed through the wireless communication circuit (e.g., the Wi-Fi direct components 532 or 542 of FIG. 5B), an identifier for the second communication, an MAC address for the second communication, and information about the second communication with the external electronic device 102.

According to various embodiments, in operation 614, a second communication channel may be established between the electronic device (e.g., the processor 120) and the external electronic device 102 so that the electronic device (e.g., the processor 120) may operate as a host and the external electronic device 102 may operate as a device. For example, the electronic device 101 may identify the role in the first communication and may additionally generate second communication with the external electronic device 102 in the corresponding role.

According to an example embodiment, when the electronic device (e.g., the processor 120) operates as a host role in the first communication based on USB with the external electronic device (e.g., the external electronic device 102 of FIG. 1), a second communication connection may be performed so that the electronic device (e.g., the processor 120) operates as a device role in the second communication based on WSB.

According to an example embodiment, when the second communication is performed based on the WSB while the electronic device 101 (e.g., the processor 120) operates as a host role in the first communication based on the USB, the electronic device 101 (e.g., the processor 120) may operate as the device role in the second communication and the external electronic device (e.g., the external electronic device 102 of FIG. 1) may operate as the host role.

According to an example embodiment, when the second communication is performed between the electronic device (e.g., the processor 120) and the external electronic device (e.g., the external electronic device 102 of FIG. 1) based on a second WSB or a wired USB while the first communication is performed the electronic device (e.g., the processor 120) and the external electronic device (e.g., the external electronic device 102 of FIG. 1) based on a first WSB, the electronic device (e.g., the processor 120) may be set to operate as a role opposite the role in the first communication. For example, when the electronic device 101 operates as a host role in the first communication based on the first WSB, a second communication connecting operation may be performed so that the electronic device 101 operates as the device role in the second communication based on the second WSB or the wired USB. As another example, when the electronic device 101 operates as a device roll in the first communication based on the first WSB, the second communication connecting operation may be performed so that the electronic device 101 operates as a host role in the second communication based on the second WSB or the wired USB.

Figure 7:
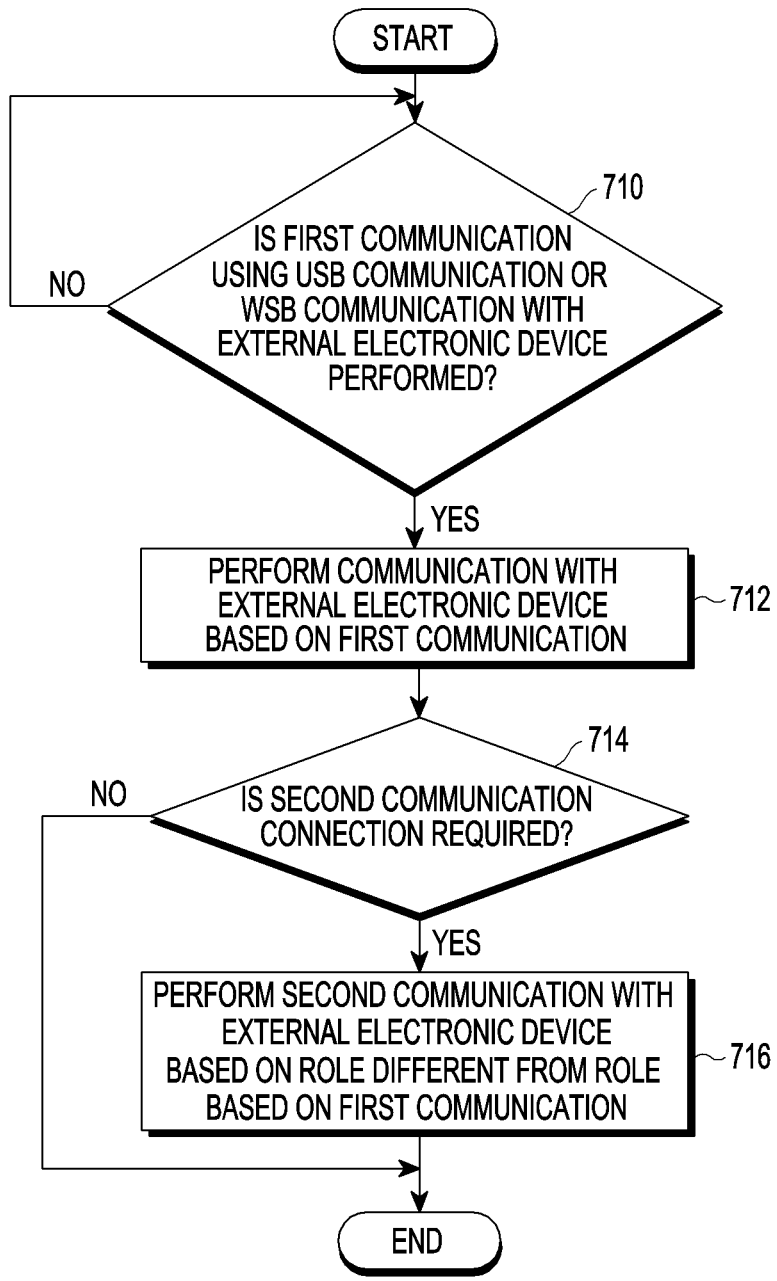
FIG. 7 is a flowchart illustrating an operation in which an electronic device communicates with an external electronic device via a plurality of different roles according to various embodiments.

FIG. 7 is a flowchart illustrating an operation in which an electronic device communicates with an external electronic device via a plurality of different roles according to various embodiments.

Hereinafter, an operation in which an electronic device according to various embodiments performs a first communication with an external electronic device using a USB or a WSB and performs a second communication with the external electronic device using the WSB will be described in greater detail with reference to FIG. 7.

According to various embodiments, in operation 710, an electronic device (e.g., the electronic device 101 of FIG. 1) may determine whether a first communication using a USB or a WSB is performed with an external electronic device (e.g., the external electronic device 102 of FIG. 1). For example, the electronic device 101 may determine whether the first communication using a USB cable or a WSB with the external electronic device may be determined. According to an example embodiment, the electronic device 101 may periodically determine whether it is connected to the external electronic device by using the USB communication interface 420 or the WSB communication interface 430. According to an example embodiment, when the first communication between the electronic device 101 and the external electronic device is performed, the role of the electronic device 101 in the first communication may be identified. The electronic device 101 may determine whether it operates as a host role or a device role based on the first communication.

According to various embodiments, in operation 712, the electronic device 101 may perform communication with the external electronic device based on the first communication. According to an example embodiment, the electronic device 101 may perform communication with the external electronic device based on the first communication using a wired communication interface (e.g., the USB communication interface 420 of FIG. 4B) or a wireless communication circuit (e.g., the WSB communication interface 430 of FIG. 4B). For example, when the electronic device 101 performs the first communication based on the host role, the electronic device 101 may request information about the external electronic device 102 or may perform control for transmitting and receiving data. As another example, when the electronic device 101 performs the first communication based on the device role, the electronic device 101 may operate based on the request of the external electronic device 102 operating as the host role or may transmit and receive data based on the control of the external electronic device 102.

According to various embodiments, in operation 714, the electronic device 101 may detect (determine) whether second communication using the wireless communication circuit with the external electronic device is required. According to an example embodiment, the electronic device 101 may identify an event associated with the second communication after the first communication with the external electronic device is performed, and may perform the second communication with the external electronic device based on the identified event. According to an example embodiment, in a state in which the first communication with the external electronic device is performed via the wired communication interface (e.g., the USB communication interface 420) or the wireless communication circuit (e.g. the WSB communication interface 430), the electronic device 101 may detect whether the second communication is required. According to an example embodiment, in a state in which the first communication (e.g., WSB communication) is performed via the wireless communication circuit (e.g., the Wi-Fi direct component 436), the electronic device 101 may detect whether the connection of the second communication (e.g., USB communication) based on the wired communication interface (e.g., the USB connector 425 of FIG. 4B). According to an example embodiment, in a state in which the first communication is performed via the wireless communication circuit (e.g., the Wi-Fi direct component 436 of FIG. 4B), the electronic device 101 may detect whether the connection of the second communication is required. According to an example embodiment, in a state in which the first communication is performed between the electronic device 101 and the external electronic device via the wired communication interface, the electronic device 101 may detect whether the connection of the second communication using the wireless communication circuit with the external electronic device is required. According to an example embodiment, in a state in which the electronic device 101 performs the first communication via the wireless communication circuit with the external electronic device, the electronic device 101 may detect whether the connection of the second communication using the wireless communication with the external electronic device 102 is required. According to an example embodiment, when the second communication connection is detected to be required, the electronic device may perform triggering for the second communication connection. According to an example embodiment, when triggering for the second communication with the external electronic device 102 is performed, the electronic device 101 may identify the role in the first communication.

According to various embodiments, in operation 716, the electronic device 101 may perform second communication with the external electronic device based on a role different from the role based on the first communication. According to an example embodiment, at least one of the electronic device 101 and the external electronic device 102 may identify the role after the first communication connection is performed, or may identify the role when an event associated with the second communication connection occurs.

According to various embodiments, when triggering for the second communication is performed while the electronic device 101 operates as a host role based on the first communication with the external electronic device, the electronic device 101 may perform a second communication connection with the external electronic device so as to operate as a role (e.g., device role) different from the host role based on the first communication. According to an example embodiment, triggering for the second communication using the wireless communication circuit with the external electronic device is performed while the electronic device 101 performs the first communication with the external electronic device in the host role via the wired communication interface or the wireless communication circuit, the electronic device 101 may perform communication with the external electronic device based on the device role in the second communication.

According to an example embodiment, when triggering for the second communication is performed while the electronic device 101 operates as the device role based on the first communication with the external electronic device, the electronic device 101 may perform communication with the external electronic device based on a role (e.g., the host role) different from the device role based on the first communication. For example, triggering for the second communication using the wireless communication circuit with the external electronic device is performed while the electronic device 101 performs the first communication with the external electronic device in the device role via the wired communication interface of the wireless communication circuit, the electronic device 101 may perform communication with the external electronic device based on the host role in the second communication.

Figure 8:
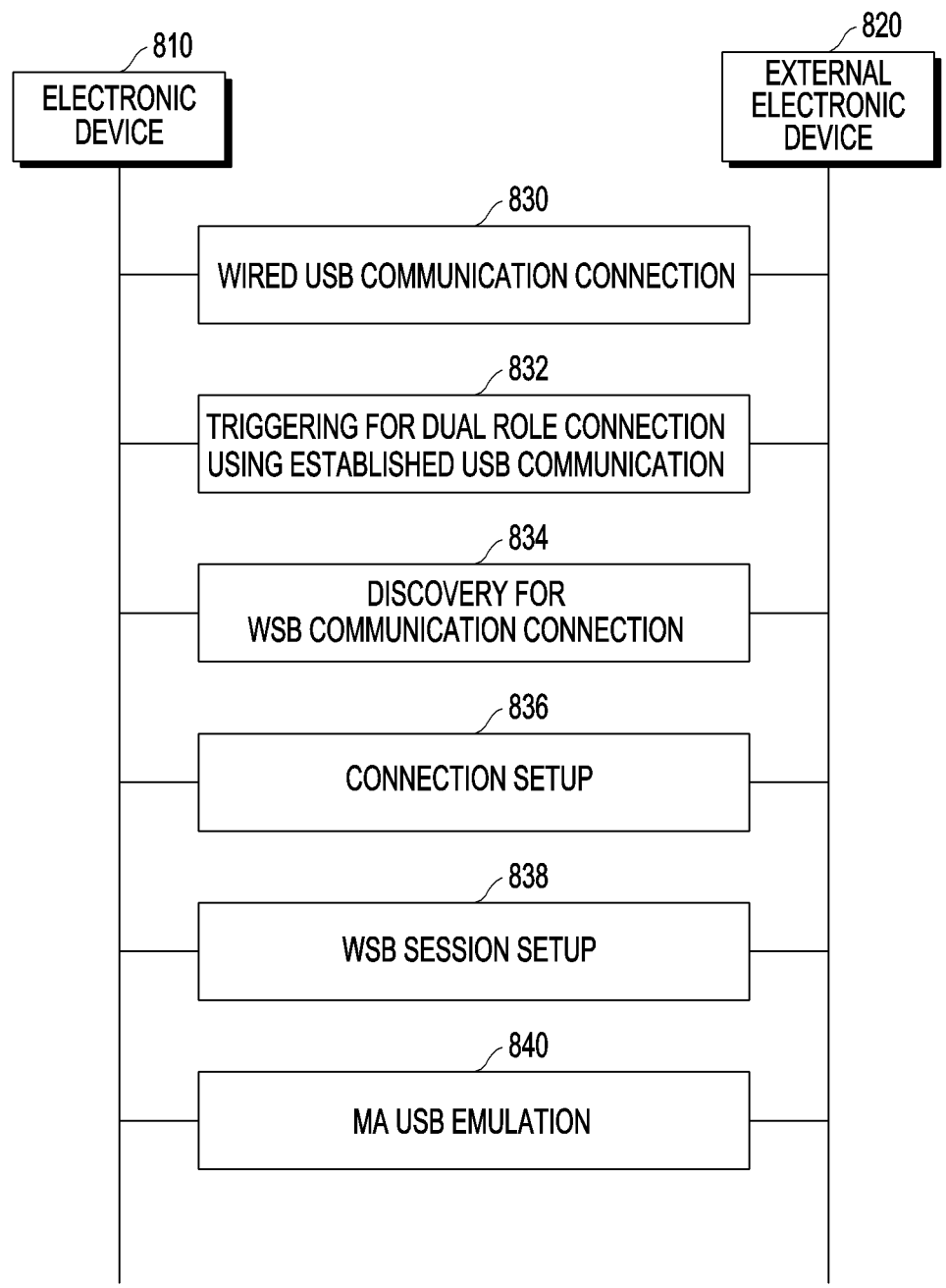
FIG. 8 is a flowchart illustrating an operation in which an electronic device and an external electronic device perform a first connection based on a wired communication interface and a second connection based on a wireless communication circuit according to an embodiment.

FIG. 8 is a flowchart illustrating an operation in which an electronic device and an external electronic device perform a first connection based on a wired communication interface and a second connection based on a wireless communication circuit according to an embodiment.

An electronic device 810 and/or an external electronic device 820 of FIG. 8 may include at least one component of the electronic device 101 of FIG. 1, and may perform at least one function or operation performed on the electronic device 101.

Hereinafter, an operation in which an electronic device according to an example embodiment and an external electronic device perform a first communication connection based on a wired communication interface (e.g., the USB communication interface 420 of FIG. 4B) and a second communication connection based on a wireless communication circuit (e.g., the WSB communication interface 430 of FIG. 4B) will be described in greater detail with reference to FIG. 8.

According to various embodiments, in operation 830, the electronic device 810 and the external electronic device 820 may establish a USB communication through the wired communication interface (e.g., the USB communication interface 420 of FIG. 4B). Each of the electronic device 810 and the external electronic device 820 may perform communication via at least one USB connector configured on a wired communication interface. According to an example embodiment, each of the electronic device 810 and the external electronic device 820 may include at least one USB connector (e.g., the USB connector 425 of FIG. 4B) and may be connected via a USB cable. The electronic device 810 and the external electronic device 820 may be connected to the USB connector through the USB cable and may perform the first communication using the USB communication method.

According to an example embodiment, when the electronic device 810 is connected to the external electronic device 820 via the USB connector, the electronic device 810 and the external electronic device 820 may perform an operation based on the role of the USB (e.g., the electronic device 810 operates as the host role and the external electronic device 820 operates as the device role, or the electronic device 810 operates as the device role and the external electronic device 820 operates as the host role). For example, when the electronic device 810 is a smartphone and the external electronic device 820 is a PC, the electronic device 810 may operate as the device roll, and the external electronic device 820 may operate as the host roll. As another example, the electronic device 810 operates as the host roll, and the external electronic device 820 may operate as the device roll. The electronic device 810 and the external electronic device 820 may respectively operate as the host role and the device role based on the USB via the first communication based on the USB.

According to various embodiments, in operation 832, the electronic device 810 and the external electronic device 820 may perform triggering to further perform the second communication after the first communication is established. When triggering is performed while the first communication is performed between the electronic device 810 and the external electronic device 820 via the wired communication interface (e.g., the USB communication interface 420 of FIG. 4B), the second communication using the wireless communication circuit (e.g., the WSB communication interface 430 of FIG. 4B) may be further performed. According to an example embodiment, the electronic device 810 may exchange information including at least one of a peer to peer (P2P) address exchange, a USB role exchange, and capability of the WSB with the external electronic device 820 through the triggering. According to an example embodiment, the triggering may be performed to determine the need for a WSB communication connection, in a state in which the electronic device 810 is connected to the USB-based external electronic device 820. According to an example embodiment, the triggering may be performed by a user's request, may be automatically performed at the time of the first communication connection, or may be performed when a specific application is executed. For example, triggering may be performed to perform a new WSB connection according to conditions such as a designated quality of the first communication connection using a designated function (e.g., file sharing) in the electronic device 810 depending on at least one of the user's request, the first communication connection, and the execution of the specific application. For example, triggering may be performed to perform a new WSB communication using an unstructured vendor defined message (VDM) while the electronic device 810 is connected to the external electronic device 820 via the USB. For example, the electronic device 810 including a USB Type C may perform power delivery (PD) communication via a configuration channel (CC) within the USB Type C, and triggering may be performed to determine whether the external electronic device 820 can support the second communication using the WSB, using the unstructured VDM among PD messages using PD communication.

According to various embodiments, in operation 834, the electronic device 810 and the external electronic device 820 may perform discovery for a WSB communication connection. For example, the discovery may operate as pre-association discovery. The electronic device 810 may perform discovery to perform the second communication based on a second role (e.g., the device role) different from a first role (e.g., the host role) in a state in which the electronic device 810 performs the first communication based on the first role (e.g., the host role) with the external electronic device 820. For example, the electronic device 810 may perform discovery to perform the second communication based on the WSB in a state in which the first communication based on the USB is performed between the electronic device 810 and the external electronic device 820, and may exchange at least one of a service name (e.g., a role opposite the role designated by the USB connection), an advertisement identifier, and service information with the external electronic device 820. For example, the electronic device 810 and the external electronic device 820 may exchange the service name which is set according to the specified role or the automatically set role through the discovery operation, and may perform the WSB connection according to each role based on the exchanged service name.

According to an example embodiment, in operation 836, the electronic device 810 and the external electronic device 820 may perform connection setup. The electronic device 810 may exchange at least one of a service name for the WSB communication connection, information about a role opposite to the role designated by the USB connection, an advertisement identifier, and service information, and may perform connection setup with the external electronic device 820 based on at least a part of the exchanged information.

According to an example embodiment, in operation 838, the electronic device 810 and the external electronic device 820 may perform WSB session setup. The electronic device and the external electronic device may perform a WSB session setup operation when the connection setup operation is completed. For example, in the first communication connection, when the electronic device 810 operates as a USB device roll, the WSB service component of the external electronic device 820 may request an ASP to initiate a WSB session request. For example, the WSB service may invoke a connection session method that includes parameters configured to identify the device role at the WSB, to indicate how to establish a P2P connection, and to request the WSB session. The WSB service may select a transport mode for an MA USB protocol in the requested WSB session. For example, the WSB service may select the transport mode for the MA USB protocol at the requested WSB session, based on supported transport modes (e.g., IP or MAC) identified in service information from the device role at the WSB and preferences of the transport mode of the host role at the WSB.

According to various embodiments, in operation 840, the electronic device 810 and the external electronic device 820 may perform MA USB emulation. When the electronic device 810 or external electronic device 820 performs WSB session setup, the WSB service of the electronic device 810 or the WSB service of the external electronic device 820 may exchange MA USB packets through the P2P wireless connection, and may activate the MA USB protocol for the USB device role. The MA USB protocol may perform USB data delivery and the USB device role according to a transmission role transmitted for the WSB session. According to an example embodiment, the electronic device 810 may perform the WSB communication based on a role (e.g., the device role) different from the role (e.g., the host role) in the USB communication.

In FIG. 8, the electronic device 810 may be connected to the external electronic device 820 via the USB, and then the WSB communication is additionally performed as has been described, but this is merely an example, and according to various embodiments, the electronic device 810 may be connected to the external electronic device 820 via the WSB communication, and then the USB may be additionally connected. According to an example embodiment, in a state in which the electronic device 810 operates as the host role through a wireless connection based on the WSB including a Wi-Fi direction connection, the electronic device 810 may additionally operate as the device role via a wired connection based on the USB. According to an example embodiment, in a state in which the electronic device 810 operates as the host hole via a wireless connection based on the WSB including the Wi-Fi direct connection, when the electronic device 810 is designated as the host role via the wired connection based on the USB, the host role in the WSB may be changed to the device role. According to an example embodiment, when a dual role connection (e.g., the host role and the device role) between the electronic device 810 and the external electronic device 820 is completed, the electronic device 810 may change a user interface or may output a pop-up for notifying a user of the change in the user interface. According to an example embodiment, at least one of the change in the user interface and the output of the pop-up thereof may be performed in the same manner even when another dual role is completed.

Figure 9:
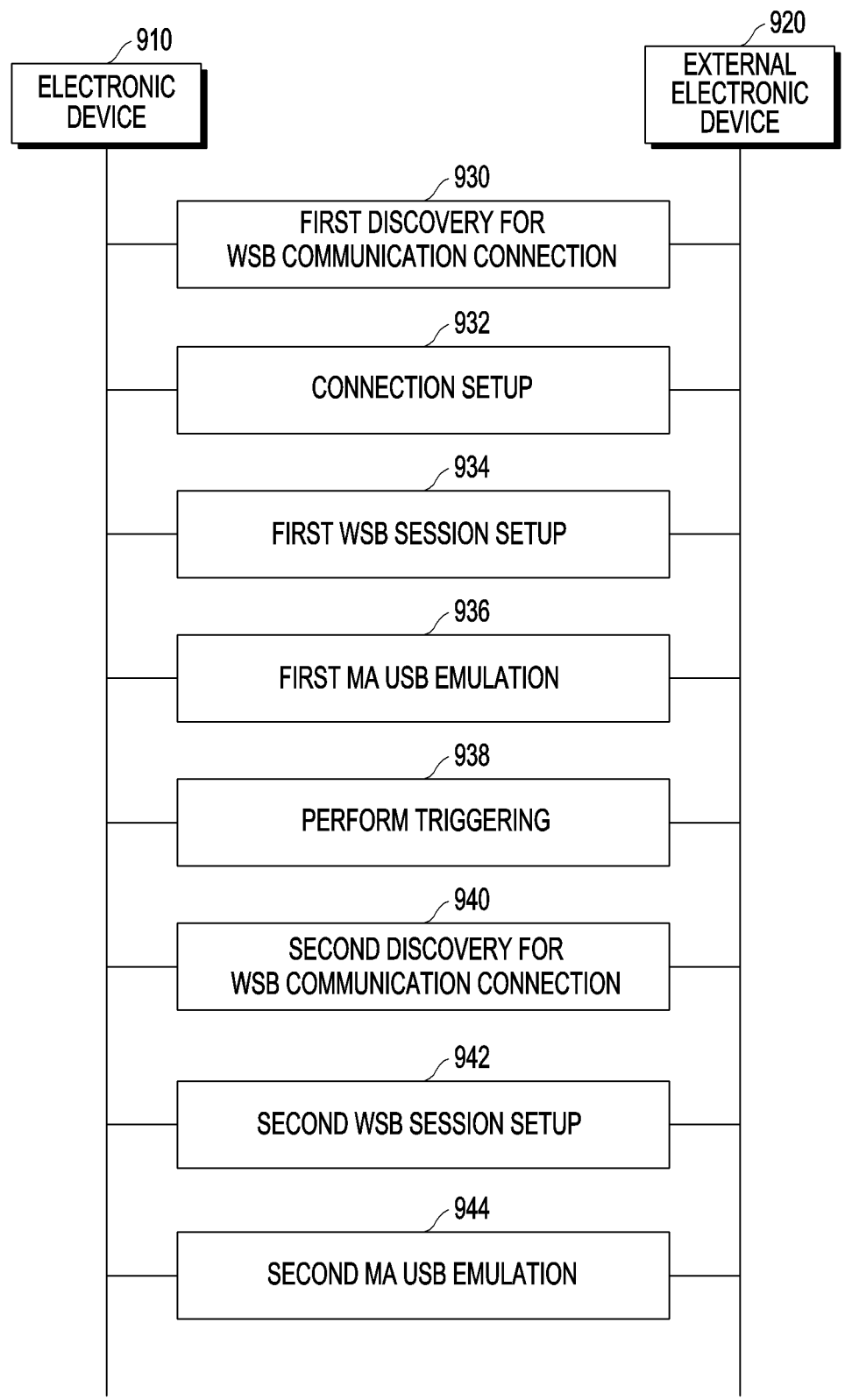
FIG. 9 is a flowchart illustrating an operation in which an electronic device and an external electronic device establish a first connection and a second connection based on a WSB according to an embodiment.

FIG. 9 is a flowchart illustrating an operation in which an electronic device and an external electronic device establish a first connection and a second connection based on a WSB according to an embodiment.

Hereinafter, a WSB communication connecting operation in which an electronic device 910 according to an example embodiment and an external electronic device 920 operate as different roles through a discovery operation of each of a first connection and a second connection based on a WSB will be described in greater detail with reference to FIG. 9. The electronic device 910 and/or the external electronic device 920 of FIG. 9 may include at least one component of the electronic device 101 of FIG. 1, and may perform at least one function or operation performed in the electronic device 101.

According to various embodiments, in operation 930, the electronic device 910 and the external electronic device 920 may perform first discovery for a WSB communication connection. The first discovery may be referred to as pre-association discovery. According to an example embodiment, the electronic device 910 may perform a discovery operation to set up a connection with the external electronic device 920. The electronic device 910 may exchange at least one of a service name (e.g., information about the roles of the electronic device 910 and the external electronic device 920), an advertisement identifier, and service information, with the external electronic device 920 through the first discovery. For example, the service names of the electronic device 910 and the external electronic device 920 may include information about the USB role at the time of the WSB communication connection such as the host role in the WSB or the device role in the WSB.

According to various embodiments, in operation 932, the electronic device 910 and the external electronic device 920 may perform connection setup. For example, the electronic device 910 may perform connection setup with the external electronic device 920 based on at least one of the service name (e.g., information about the roles of the electronic device 910 and the external electronic device 920) exchanged with the external electronic device 920 in the discovery operation, the advertisement identifier, and service information.

According to various embodiments, in operation 934, the electronic device 910 and the external electronic device 920 may perform first WSB session setup. The electronic device 910 may exchange at least one of a service name, an advertisement identifier, session MAC information, a session identifier, and session information with the external electronic device 920, and then may perform first WSB session setup with the external electronic device 920. According to an example embodiment, the electronic device 910 and the external electronic device 920 may maintain the at least one of the service name, the advertisement identifier, the session MAC information, the session identifier, and the session information which are exchanged by the previously performed session setup operation. According to an example embodiment, in operation 934, the electronic device 910 and the external electronic device 920 may use the at least one of the service name, the advertisement identifier, the session MAC information, the session identifier, and the session information which are exchanged by the previously performed session setup operation in order to perform session setup in operation 934. According to an example embodiment, the electronic device 910 and the external electronic device 920 may perform a plurality of WSB session setup operations. For example, when the plurality of WSB sessions is set up between the electronic device 910 and the external electronic device 920, the advertisement identifier and the session identifier in each WSB session may be different from each other.

According to various embodiments, in operation 936, the electronic device 910 and the external electronic device 920 may perform first MA USB emulation. For example, the electronic device 910 or the external electronic device 920 performs the first WSB session setup, the WSB service of the electronic device 910 or the WSB service of the external electronic device 920 may perform a first MA USB emulation operation. According to an example embodiment, the electronic device 910 may operate as the device role in the first communication based on the first WSB session setup, and the external electronic device 920 may operate as the host role. According to another embodiment, the electronic device 910 may operate as the host role and the external electronic device 920 may operate as the device role. According to an example embodiment, when the electronic device 910 is a smart phone and the external electronic device 920 is a PC, the electronic device 910 may operate as the device role and the external electronic device 920 may operate as the host role. As another example, the electronic device 910 may operate as the host role and the external electronic device 920 may operate as the device role.

According to various embodiments, in operation 938, the electronic device 910 and the external electronic device 920 may perform triggering. The electronic device 910 and the external electronic device 920 may perform triggering for the second WSB session setup. For example, the electronic device may perform triggering to determine the need of a second WSB communication connection while the first WSB communication connection is performed. For example, the electronic device may perform triggering based on at least one of a user's request, the first WSB communication connection, and the execution of a specific application. After triggering is performed between the electronic device 910 and the external electronic device 920, the electronic device 910 may identify whether the USB role in the first WSB communication is the host role or the device role. The electronic device 910 and the external electronic device 920 may perform triggering to further perform the second WSB connection after the first WSB session setup is performed. According to an example embodiment, the triggering may be performed for the second communication connection based on the WSB while the first communication connection based on the WSB is performed therebetween. According to an example embodiment, the triggering may be performed when the first communication and second communication based on the WSB are simultaneously performed between the electronic device 910 and the external electronic device 920. According to an example embodiment, the triggering may be performed for the second WSB communication connection in the WSB when the first communication in the WSB connection is performed with the external electronic device 920. For example, triggering for performing the second WSB connection may be performed according to conditions such as a user's request, the use of a function (e.g., file sharing) designated by the electronic device 910, or designated quality of the first communication connection.

According to various embodiments, in operation 940, the electronic device 910 and the external electronic device 920 may perform second discovery for the WSB communication connection. The second discovery may be referred to as post-association discovery. According to an example embodiment, the electronic device 910 may perform the second discovery operation to perform the second WSB communication connection which is triggered for the second connection with the external electronic device 920. After the first WSB session setup is performed, the electronic device 910 and the external electronic device 920 may perform a discovery operation to further perform second WSB session setup.

The electronic device 910 and the external electronic device 920 may perform the second discovery (e.g., post-association discovery) based on a currently connected Wi-Fi direct group, and services which are advertised and sought by the electronic device 910 and the external electronic device 920 may have a role opposite a first connection. The electronic device 101 may exchange at least one of a service name (e.g., information about the roles of the electronic device 910 and the external electronic device 920), an advertisement identifier, and service information with the external electronic device 920 through the second discovery. The advertisement identifier and the session identifier may be at least partially different from the advertisement identifier and the session identifier exchanged in the first discovery operation. According to an example embodiment, after the second discovery is performed between the electronic device 910 and the external electronic device 920, the connection setup (e.g., link connection) may be omitted.

According to various embodiments, in operation 942, the electronic device and the external electronic device 920 may perform the second WSB session setup. The electronic device 910 may exchange at least one of the service name, the advertisement identifier, session MAC information, a session identifier, and session information with the external electronic device 920, and then may performs the second WSB session setup with external electronic device 920. According to an example embodiment, the advertisement identifier and the session identifier in the second WSB session setup may differ from the advertisement identifier and session identifier in the first WSB session setup in operation 934. According to an example embodiment, each WSB session may have a different IP or a different port. According to an example embodiment, the role performed according to the second WSB session and the role performed according to the first WSB session may be different from each other. For example, when the role performed according to the first WSB session is a host (or device) role, the role performed according to the second WSB session may be a device (or host) role. The electronic device 910 may exchange at least one of the advertisement identifier, the session MAC address, the session identifier, and the session information with the external electronic device 920 through the second WSB session setup with the external electronic device 920.

According to various embodiments, in operation 944, the electronic device 910 and the external electronic device 920 may perform a second MA USB emulation. When the second WSB session setup is performed between the electronic device 910 and the external electronic device 920, the second MA USB emulation operation is performed, and the WSB service of the electronic device 910 and the WSB service of the external electronic device 920 may exchange MA USB packets through a P2P wireless connection. Each of the electronic device 910 and the external electronic device 920 may operate as a dual role by performing a plurality of WSB session setup operations using one-time connection setup. For example, the electronic device 910 may perform first WSB session setup based on one-time connection setup to operate as the host roll for the external electronic device 920, and may perform second WSB session setup to operate as the device role with respect to the external electronic device 920.

Figure 10:
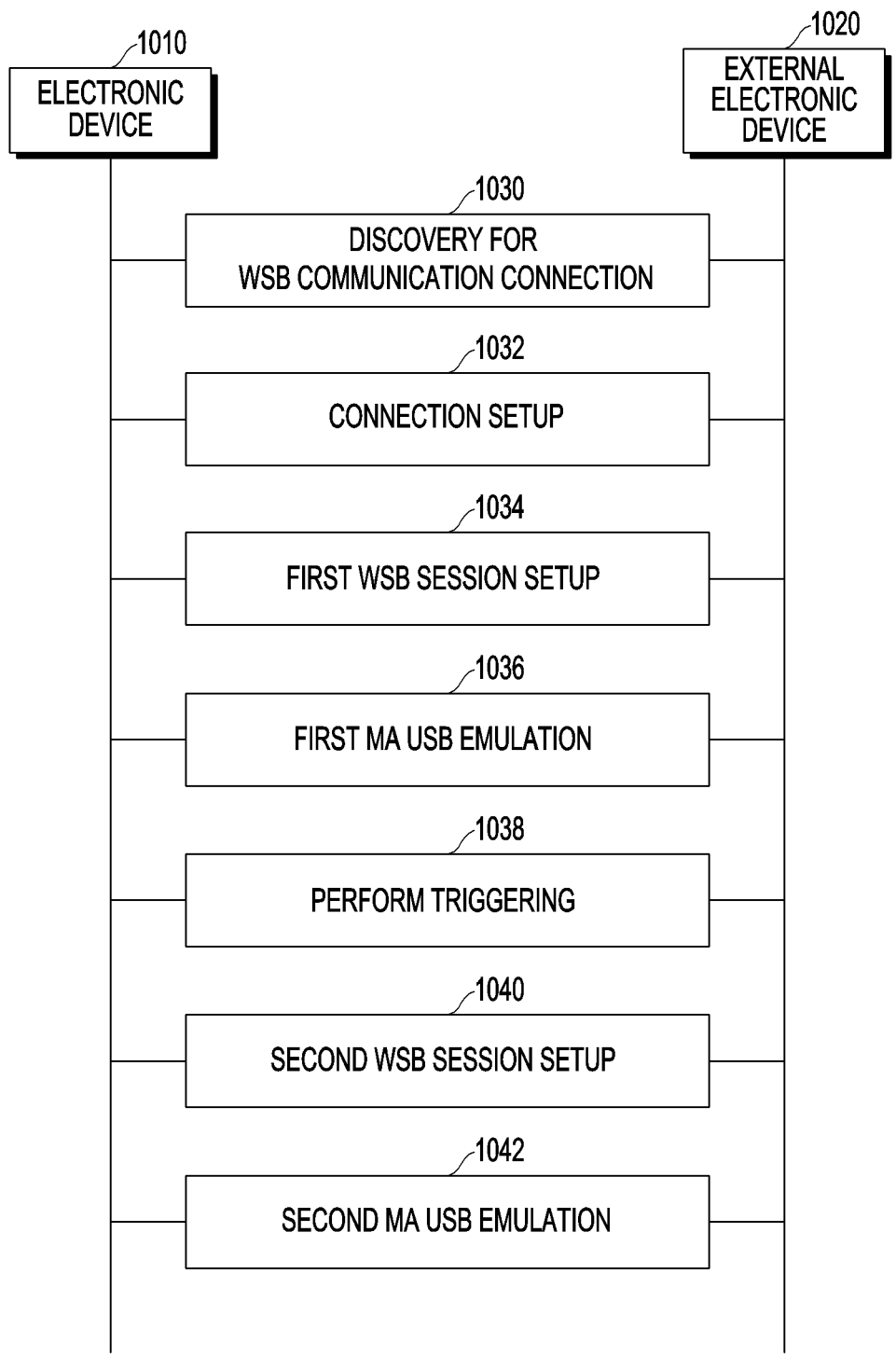
FIG. 10 is a flowchart illustrating an operation in which an electronic device and an external electronic device perform a plurality of WSB connections through one discovery according to another embodiment.

FIG. 10 is a flowchart illustrating an operation in which an electronic device and an external electronic device perform a plurality of WSB connections through one discovery according to another embodiment.

Hereinafter, an operation in which an electronic device according to another embodiment and an external electronic device operate as different roles in a multi-session using one-time discovery operation will be described in greater detail with reference to FIG. 10.

An electronic device 1010 and/or an external electronic device 1020 of FIG. 10 may include at least one component, and may perform at least one function or operation performed in the electronic device 101.

According to various embodiments, in operation 1030, the electronic device 1010 and the external electronic device 1020 may perform discovery for a WSB communication connection. According to an example embodiment, the electronic device 1010 and the external electronic device 1020 may perform a plurality of WSB session setup operations through one-time discovery based on the WSB. According to an example embodiment, the electronic device 1010 and the external electronic device 1020 may perform one-time discovery to set up a plurality of communication operations based on the WSB. The electronic device 1010 and the external electronic device 1020 may exchange information about a multi-service name, a multi-advertisement identifier, service information, and information about dual role capability through one-time discovery. The electronic device 1010 and the external electronic device 1020 may exchange the multi-service name and the multi-advertisement identifier by separately specifying the service name and the advertisement identifier matching the respective roles.

According to various embodiments, in operation 1032, the electronic device 1010 and the external electronic device 1020 may perform connection setup. The electronic device 1010 and the external electronic device 1020 may perform connection setup using a created or generated P2P group. According to an example embodiment, the electronic device 1010 may exchange at least one of the multi-service name (information about the roles of the electronic device 1010 and the external electronic device 1020), the multi-advertisement identifier, and the information about dual role capability with the external electronic device 1020 through one-time discovery operation, and may perform connection setup with the external electronic device 1020 based on at least a part of the exchanged information.

According to various embodiments, in operation 1034, the electronic device 1010 and the external electronic device 1020 may perform the first WSB session setup. The electronic device 1010 may exchange at least one of the service name, the advertisement identifier, session MAC information, a session identifier, and session information for the first WSB session setup with the external electronic device 1020, and may perform the first WSB session setup with the external electronic device 1020.

According to various embodiments, in operation 1036, the electronic device 1010 and the external electronic device 1020 may perform the first MA USB emulation. When the electronic device 1010 or the external electronic device 1020 performs the first WSB session setup, the WSB service of the electronic device 1010 or the WSB service of the external electronic device 1020 may exchange MA USB packets through the P2P wireless connection.

According to various embodiments, in operation 1038, the electronic device 1010 and the external electronic device 1020 may perform triggering for second WSB session setup. The electronic device 910 and the external electronic device 920 may perform triggering for the second WSB session setup after the first WSB session setup is performed. The electronic device 1010 and the external electronic device 1020 may perform triggering to further perform second WSB session setup after the first WSB session setup is performed. According to an example embodiment, the discovery operation between the electronic device 1010 and the external electronic device 1020 may be omitted. According to an example embodiment, the electronic device 1010 and the external electronic device 1020 may transmit and receive information for a plurality of session setup operations through one-time discovery in operation 1030. According to an example embodiment, the triggering for further performing the second WSB session setup may be performed by a user's request, or may be automatically performed at the time of the connection of the first WSB session setup, or may be performed when a specific application is executed.

According to various embodiments, in operation 1040, the electronic device 1010 and the external electronic device 1020 may perform the second WSB session setup. According to an example embodiment, the electronic device 1010 may exchange at least one of the service name, the advertisement identifier, the session MAC information, the session identifier, or the session information for the second WSB session setup with the external electronic device 1020, and may perform the second WSB session setup with the external electronic device 1020. According to an example embodiment, the advertisement identifier and the session identifier in the second WSB session setup may be at least partially different from the advertisement identifier and the session identifier in the first WSB session setup in operation 1034. According to an example embodiment, each WSB session may have a different IP or a different port. According to an example embodiment, the role performed according to the second WSB session and the role performed according to the first WSB session may be different from each other. When the role performed according to the first WSB session is a host (or device) role, the role performed according to the second WSB session may be a device (or host) role.

According to various embodiments, in operation 1042, the electronic device 1010 and the external electronic device 1020 may perform second MA USB emulation. When second WSB session setup is performed between the electronic device 1010 and the external electronic device 1020, the electronic device 1010 and the external electronic device 1020 may perform the second MA USB emulation, and the WSB service of the electronic device 1010 and the WSB service of the external electronic device 1020 may exchange MA USB packets through the P2P wireless connection. As shown in FIG. 10, the electronic device 1010 and the external electronic device 1020 may exchange the multi-service name for multi-WSB session setup, a multi-advertisement identifier, service information, and information about dual role capability with the external electronic device 1020 through one-time discovery to perform multi-WSB session setup.

According to an example embodiment, by performing a plurality of WSB session setup operations using one-time discovery operation and one-time connection setup, each of the electronic device 1010 and the external electronic device 1020 may operate as a dual role. For example, the electronic device 1010 may perform the first WSB session setup operation based on one-tie discovery operation and one-time connection setup operation to operate as a host role with respect to the external electronic device 1020, and may perform the second WSB session setup operation to operate as the device role with respect to the external electronic device 1020.

Figure 11:
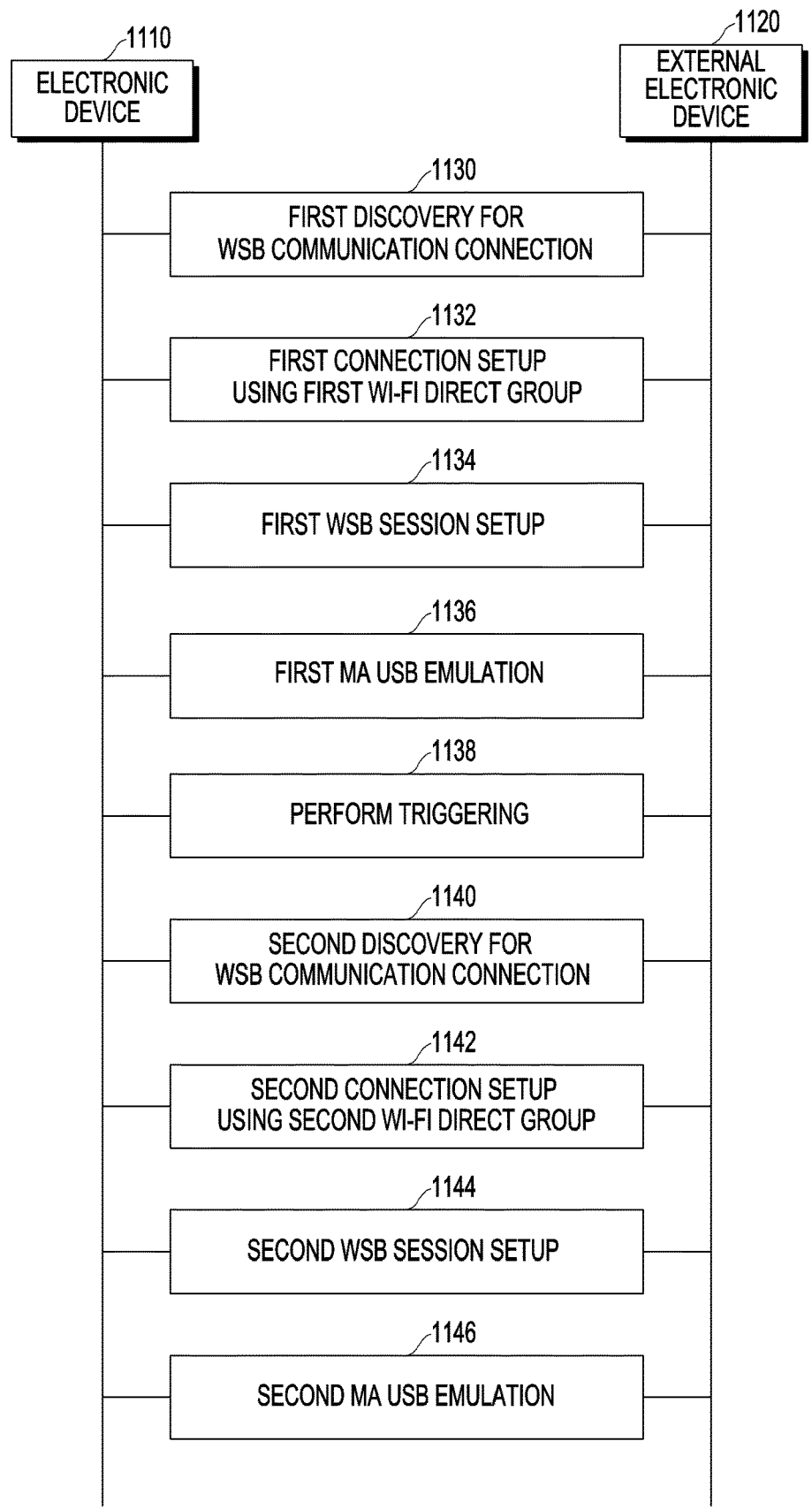
FIG. 11 is a flowchart illustrating an operation in which an electronic device and an external electronic device set up a multi-session by utilizing a multi-P2P group according to an embodiment.

FIG. 11 is a flowchart illustrating an operation in which an electronic device and an external electronic device set up a multi-session by utilizing a multi-P2P group according to an embodiment.

Hereinafter, an operation in which an electronic device according to an example embodiment and an external electronic device set multi-session by utilizing a multi-P2P group will be described in greater detail with reference to FIG. 11.

According to various embodiments, in operation 1130, the electronic device 1110 and the external electronic device 1120 may perform first discovery for a WSB communication connection. The first discovery may be referred to as first pre-association discovery. According to an example embodiment, the electronic device 1110 and the external electronic device 1120 may perform discovery for multi-session utilizing the multi-P2P group. Through the discovery, the electronic device 1110 and the external electronic device 1120 may exchange at least one of service exchange information (e.g., information about the roles of the electronic device 1110 and the external electronic device 1120), an advertisement identifier, and service information for the purpose of first connection setup. For example, the electronic device 1110 may exchange the at least one of the service name, the advertisement identifier, and the service information with the external electronic device 1120 in order to set up a first connection using a first Wi-Fi direct group. The service name may include, for example, information indicating that the electronic device 1110 is to operate as a host and the external electronic device 1120 is to operate as a device.

According to various embodiments, in operation 1132, the electronic device 1110 and the external electronic device 1120 may perform first connection setup using the first Wi-Fi direct group. The electronic device 1110 may perform first connection setup with the external electronic device 1120 using the first Wi-Fi direct group. The setup of the communication using the first Wi-Fi direct group may be related to a connection based on Wi-Fi direct or a P2P group creation.

According to various embodiments, in operation 1134, the electronic device 1110 and the external electronic device 1120 may perform the first WSB session setup. According to an example embodiment, the electronic device 1110 may exchange at least one of the advertisement identifier for the first Wi-Fi direct group, a session MAC address, a session identifier, and session information with the external electronic device 1120 to perform first WSB session setup.

According to various embodiments, in operation 1136, the electronic device 1110 and the external electronic device 1120 may perform the first MA USB emulation. When first WSB session setup is performed between the electronic device 1110 and the external electronic device 1120, the WSB service of the electronic device 1110 and the WSB service of the external electronic device 1120 may exchange MA USB packets through the P2P wireless connection.

According to various embodiments, in operation 1138, the electronic device 1110 and the external electronic device 1120 may perform triggering to perform the second WSB communication. After the triggering is performed, the electronic device 1110 and the external electronic device 1120 may identify whether the roll based on the first WSB communication is a host role or a device role. According to an example embodiment, in a state in which the first communication based on the WSB is performed with the external electronic device 1120, the triggering may be performed for the second communication connection based on the WSB. According to an example embodiment, the triggering may be performed when the electronic device 1110 and the external electronic device 1120 simultaneously perform the first communication and the second communication based on the WSB. According to an example embodiment, the triggering may be performed for the second WSB communication connection at the WSB when the electronic device 1110 performs the first communication with the external electronic device 1120 at the WSB connection. According to an example embodiment, after the first connection setup is performed with the external electronic device via the first Wi-Fi direct group, the electronic device 1110 may perform triggering for the second connection setup and may identify the role for the first connection setup with the external electronic device 1120.

According to various embodiments, in operation 1140, the electronic device 1110 and the external electronic device 1120 may perform second discovery for the second WSB session setup. The second discovery may be referred to as second pre-association discovery. The electronic device 1110 may perform discovery for the second WSB session setup to exchange at least one of the service name, the advertisement identifier, and the service information for the second WSB session setup with the external electronic device 1120. According to an example embodiment, in a state in which the electronic device 1110 performs the first WSB communication with the external electronic device 1120, the electronic device 1110 may perform discovery to perform the second WSB communication with the external electronic device 1120. Alternatively, even in the opposite case, discovery may be performed.

According to various embodiments, in operation 1142, the electronic device 1110 and the external electronic device 1120 may perform the second connection setup using the second Wi-Fi direct group. The electronic device 1110 may perform the second connection setup with the external electronic device 1120 using the second Wi-Fi direct group. The setup of the communication using the second Wi-Fi direct group may be related to a connection based on Wi-Fi direct or a P2P group creation. The electronic device 1110 may generate a second Wi-Fi direct group in which at least one of the frequency of the first Wi-Fi direct group, a P2P device address, a P2P interface address, and an MAC address is different. The electronic device 1110 may perform the second connection setup based on the second Wi-Fi direction group with the external electronic device 1120 through a role (e.g., the device role) different from the role (e.g., the host role) in the first connection based on the first Wi-Fi direct group. According to an example embodiment, in a state in which the electronic device 1110 operates as a host role through the first Wi-Fi direct group and the external electronic device 1120 operates as a device roll, the electronic device 1110 may exchange a role (e.g., the host role) and a P2P operation mode for creating the second Wi-Fi direct group with the external electronic device 1120 in advance, an operation of designating the role (e.g., the device role) in the second Wi-Fi direct group will be omitted. According to an example embodiment, the electronic device 1110 and external electronic device 1120 may configure the roll (e.g., the host roll) in the first WSB through the first Wi-Fi direct group in a 2.4/5 GHz band, and may configure the role (e.g., the device roll) in the second WSB through the second Wi-Fi direct group in a 60 GHz band. For example, the electronic device 1110 and the external electronic device 1120 may configure the role (e.g., the device role) in the second WSB in the second Wi-Fi direct group using the 60 GHz band so as to correspond to the role (e.g., the host role) in the first WSB in the first Wi-Fi direct group using the 2.4/5 GHz band.

According to an example embodiment, in operation 1144, the electronic device 1110 and the external electronic device 1120 may perform the second WSB session setup. For example, the electronic device 1110 may exchange at least one of an advertisement identifier for the second Wi-Fi direct group, a session MAC address, a session identifier, and session information with the external electronic device 1120 to perform the second WSB session setup. According to an example embodiment, the advertisement identifier, the session MAC address, and the session identifier in the second WSB session setup may be different from the advertisement identifier, the session MAC address, and the session identifier in the first WSB session setup in operation 1134. According to an example embodiment, each WSB session may have a different IP or different port. According to an example embodiment, the role performed according to the second WSB session and the role performed according to the first WSB session may be different from each other.

According to an example embodiment, in operation 1146, the electronic device 1110 and the external electronic device 1120 may perform the second MA USB emulation. When the second WSB session setup is performed between the electronic device 1110 and the external electronic device 1120, the electronic device 1110 and the external electronic device 1120 may perform the second MA USB emulation, and the WSB service of the electronic device 1110 and the WSB service of the external electronic device 1120 may exchange MA USB packets through the P2P wireless connection. As described above, the electronic device 1110 may simultaneously perform the host role through the first WSB communication and the device role through the second WSB communication. According to an example embodiment, the external electronic device 1120 may simultaneously perform the device roll through the first WSB communication and the host roll through the second WSB communication. In a state in which the electronic device 1110 operates as the host role through the first WSB communication and the external electronic device 1120 operates as the device role, the electronic device 1110 may operate as the device roll through the second WSB communication and the external electronic device 1120 may operate as the host role. As shown in FIG. 11, the electronic device 1110 and the external electronic device 1120 may perform a plurality of connection setup operations by making at least one of the frequency, the P2P address, and the MAC address different in the connection setup, and may perform the WSB session setup based on each connection setup.

According to various embodiments, a method in which an electronic device (e.g., the electronic device 101 of FIG. 1) including a housing; a user interface; a wireless communication circuit (e.g., the communication interface 170 of FIG. 1) disposed in the housing; a wired communication interface (e.g., the input/output interface 150 of FIG. 1) exposed through the housing; a processor (e.g., the processor 120 of FIG. 1) disposed in the housing and to be electrically connected to the user interface, the wireless communication circuit, and the wired communication interface; and a memory (e.g., the memory 130 of FIG. 1) disposed in the housing and electrically connected to the processor communicates with an external electronic device (the first external electronic device 102 of FIG. 1) may include establishing a first communication channel with the external electronic device including a storage unit using the wireless communication circuit or the wired communication interface so that the electronic device operates as a device and the external electronic device operates as a host; exchanging information with the external electronic device through the first communication channel; and establishing a second communication channel with the external electronic device using the wireless communication circuit so that the electronic device operates as a host and the external electronic device operates as a device.

According to an example embodiment, the wired communication interface may include a USB interface.

According to an example embodiment, the wireless communication circuit may support a WSB or a wireless USB protocol.

According to an example embodiment, when the first communication channel is established through the wired communication interface, the method may further include exchanging information including at least one of a P2P address, a USB role exchange, and capability of the WSB, based on the first communication channel.

According to an example embodiment, when the first communication channel is established through the wireless communication circuit, the method may further include exchanging information including at least one of a service name for the second communication channel, an advertisement identifier, and service information, through discovery with the external electronic device.

According to an example embodiment, the method may further include retrieving information about files stored in the storage unit of the external electronic device through the second communication channel.

According to various embodiments, a method in which an electronic device (e.g., the electronic device 101 of FIG. 1) including a housing; a user interface; a wireless communication circuit (e.g., the communication interface 170 of FIG. 1) disposed in the housing; a processor (e.g., the processor 120 of FIG. 1) disposed in the housing and electrically connected to the user interface and the wireless communication circuit (e.g., the communication interface 170 of FIG. 1); and a memory (e.g., the memory 130 of FIG. 1) disposed in the housing and electrically connected to the processor communicates with an external electronic device (e.g., the first external electronic device 102 of FIG. 1) may include establishing a first communication channel with the external electronic device including a storage unit using the wireless communication circuit so that the electronic device operates as a device and the external electronic device operates as a host; exchanging information with the external electronic device through the first communication channel; and establishing a second communication channel with the external electronic device using the wireless communication circuit so that the electronic device operates as a host and the external electronic device operates as a device.

According to an example embodiment, the wireless communication circuit may support a WSB or a wireless USB protocol.

According to an example embodiment, when the first communication channel is established through the wireless communication circuit using the first discovery, the method may further include exchanging information including at least one of an advertisement identifier for the first communication channel, which is exchanged based on the established first communication channel, a session MAC for the first communication, a session identifier for the first communication, and session information about the first communication.

According to an example embodiment, when the first communication channel is established through second discovery using the wireless communication circuit, the method may further include exchanging information including at least one of an advertisement identifier for the second communication channel, a session MAC for the second communication channel, a session identifier for the second communication channel, and session information about the second communication channel to establish the second communication channel.

According to an example embodiment, the method may further include exchanging a multi-service name, a multi-advertisement identifier, service information, and information about dual role capability to perform a multi-connection with the external electronic device through first discovery.

According to an example embodiment, when the first communication channel is established with the external electronic device using the first discovery, the method may further include exchanging information including at least one of an advertisement identifier for the first communication, a session MAC for the first communication, a session identifier for the first communication, and session information about the first communication.

According to an example embodiment, when the second communication channel is established after the first communication channel is established, the method may further include exchanging information including at least one of an advertisement identifier for the second communication, a session MAC for the second communication, a session identifier for the second communication, and session information about the second communication.

According to an example embodiment, after the first communication channel using a first Wi-Fi direct group is established through the wireless communication circuit, the method may further include exchanging information including at least one of an advertisement identifier for the first Wi-Fi direct group, a session MAC, a session identifier, and session information.

According to an example embodiment, after the second communication channel using a second Wi-Fi direct group is established through the wireless communication circuit, the method may further include exchanging information including at least one of an advertisement identifier for the second Wi-Fi direct group, a session MAC, a session identifier, and session information.

According to an example embodiment, the method may further include retrieving information about files stored in the storage unit of the external electronic device through the second communication channel.

According to various embodiments, a method in which an electronic device (e.g., the electronic device 101 of FIG. 1) including a housing; a user interface; a wireless communication circuit (e.g., the communication interface 170 of FIG. 1) disposed in the housing; a wired communication interface (e.g., the input/output interface 150 of FIG. 1) exposed through the housing; a processor (e.g., the processor 120 of FIG. 1) disposed in the housing and electrically connected to the user interface, the wireless communication circuit (e.g., the communication interface 170 of FIG. 1), and the wired communication interface (e.g., the input/output interface 150 of FIG. 1); and a memory (e.g., the memory 130 of FIG. 1) disposed in the housing and electrically connected to the processor communicates with an external electronic device (e.g., the first external electronic device 102 of FIG. 1) may include establishing a first communication channel with the external electronic device including a storage unit using the wireless communication circuit or the wired communication interface so that the electronic device operates as a host and the external electronic device operates as a device; exchanging information with the external electronic device through the first communication channel; and establishing a second communication channel with the external electronic device using the wireless communication circuit so that the electronic device operates as a device and the external electronic device operates as a host.

According to an example embodiment, when the first communication channel is established through the wired communication interface, the method may further include exchanging information including at least one of a P2P address, a USB role exchange, and capability of the WSB based on the first communication channel.

According to an example embodiment, when the first communication channel is established using the wireless communication circuit, the method may further include exchanging information including at least one of a service name for the second communication channel, an advertisement identifier, and service information through discovery with the external electronic device.

According to an example embodiment, the method may further include retrieving information about files stored in the storage unit of the external electronic device through the second communication channel.

Figure 12:
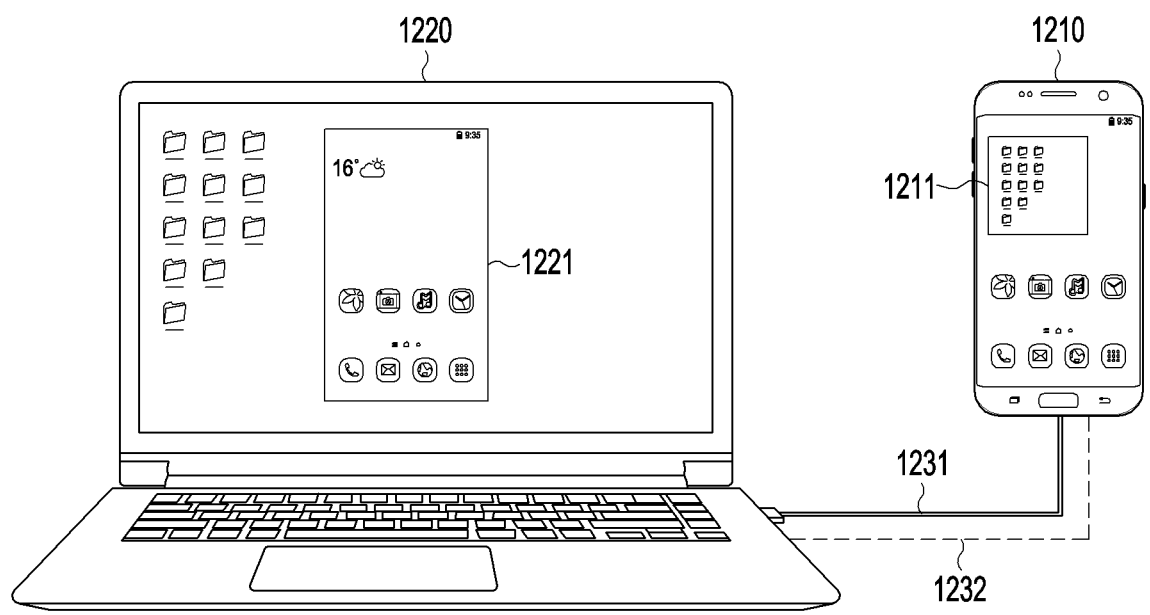
FIG. 12 is a diagram illustrating a case in which an electronic device and an external electronic device are connected to each other based on a dual role via a USB and a WSB according to an embodiment.

FIG. 12 is a diagram illustrating a case in which an electronic device and an external electronic device are connected to each other based on a dual role via a USB and a WSB according to an embodiment.

Referring to FIG. 12, each of the electronic device 1210 according to an example embodiment and an external electronic device 1220 may support a host role and a device role simultaneously. For example, when a user controls (e.g., updates, deletes, downloads, etc.) data (e.g., photos, videos, documents, etc.) stored in the electronic device 1210 using the external electronic device 1220, the external electronic device 1220 may operate as the host role, and the electronic device 1210 may operate as the device role. When the user controls the data stored in the external electronic device 1220 using the electronic device 1210, the external electronic device 1220 may operate as the device role, and the electronic device 1210 may operate as host role. Thus, when USB communication 1231 and WSB communication 1232 are performed between the electronic device 1210 and the external electronic device 1220, the electronic device 1210 and the external electronic device 1220 may simultaneously support the host role and the device role.

According to an example embodiment, the electronic device 1210 may transmit and receive data to and from the external electronic device 1220 via a dual role (e.g., host role and device role). The external electronic device 1220 may transmit and receive data to and from electronic device 1210 via dual rolls (e.g., host role and device role). For example, through the dual role, the electronic device 1210 may access the memory of the external electronic device 1220 to control (e.g., update, delete, download, etc.) the data stored in the memory, or may display 1211 a screen displayed on the display of the external electronic device 1220. As another example, the external electronic device 1220 may access the memory of the electronic device 1210 to control the data stored in the memory, or may display 1221 the screen displayed on the display of the electronic device 1210 on the external electronic device 1220.

The embodiment of FIG. 12 may also be utilized in a program (e.g., Samsung SideSync) that mirrors the screen of the electronic device 1210 (e.g., a smartphone) in the external electronic device 1220 (e.g., notebook). The program (for example, Samsung SideSync) is a specialized service that allows a user to display and control the screen of the smartphone on a desktop or a notebook, and may provide functions of transmitting the screen of the smartphone to the notebook and transmitting an input of a keyboard and a mouse to the smartphone.

In the related art, when the electronic device 1210 and the external electronic device 1220 are connected to each other via the USB communication 1231 or the WSB communication 1232 to perform side synchronization, the external electronic device 1220 may operate as the host role and the electronic device 1210 may operate as the device role, so that the file of the electronic device 1210 may be confirmed by the external electronic device 1220. However, the file of the external electronic device 1220 cannot be confirmed by the electronic device 1210.

According to various embodiments, when the electronic device 1220 and the external electronic device 1210 are connected to each other via the USB or the WSB to perform side synchronization, a new WSB connection may be created so that the dual role that supports a role opposite to the currently performed role may be configured. When the new WSB connection is performed, the electronic device 1210 and the external electronic device 1220 may have different USB role connections. For example, the external electronic device 1220 operating as the host role based on the USB may simultaneously operate as the device role based on the WSB to access the file of the external electronic device 1220 at the electronic device 1210. This allows a user to control the external electronic device 1220 at the electronic device 1210 and to control the electronic device 1210 at the external electronic device 1220. For example, when the electronic device 1210 and the external electronic device 1220 are connected based on the dual role, information about the dual role connection may be displayed on at least some areas of the screen of the electronic device 1210, or a notification may be provided to a user through voice. For example, the electronic device 1210 and the external electronic device 1220 may provide the user with a pop-up notification of dual role usage. Alternatively, the electronic device 1210 and external electronic device 1220 may display information associated with support for the dual role in at least some areas of the screen.

Figures 13A, 13B:
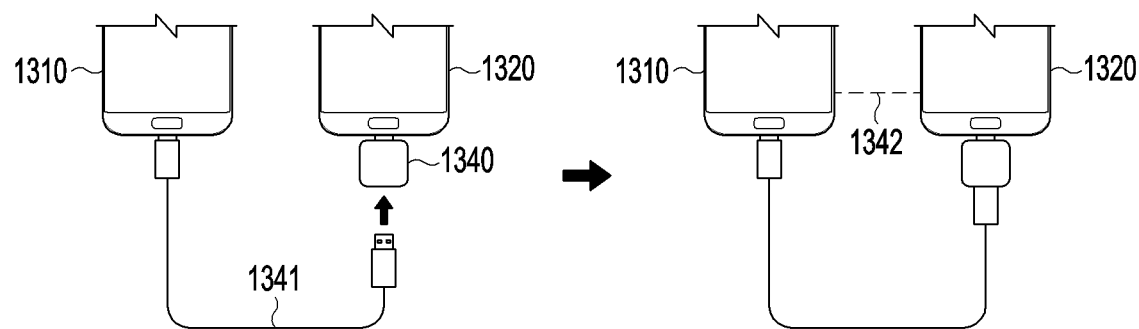
FIG. 13A is a diagram illustrating a case in which an electronic device and an external electronic device are connected to each other via a USB according to an embodiment.
FIG. 13B is a diagram illustrating a case in which a WSB is connected while an electronic device and an external electronic device are connected to each other via a USB according to an embodiment.

FIG. 13A is a diagram illustrating a case in which an electronic device and an external electronic device are connected to each other via a USB according to an embodiment, and FIG. 13B is a diagram illustrating a case in which a WSB is connected while an electronic device and an external electronic device are connected to each other via a USB according to an embodiment.

Referring to FIGS. 13A and 13B, an electronic device 1310 or an external electronic device 1320 may support the host role and the device role simultaneously. In a state where the electronic device 1310 perform a first communication with the external electronic device 1320 in the host role based on USB communication 1341, second communication may be performed with the external electronic device 1320 in the device role based on WSB communication 1342. The electronic device 1310 may transmit and receive data to and from the external electronic device 1320 via the dual role (e.g., host role and device role). Similarly, the external electronic device 1320 may transmit and receive data to and from the electronic device 1310 via the dual role (e.g., host role and device role). Through this dual role, the electronic device 1310 may receive data stored in the external electronic device 1320 and may transmit data stored in the electronic device 1310 to the external electronic device 1320. In this manner, a user may respectively control the external electronic device 1320 and the electronic device 1310 at the electronic device 1310 and the external electronic device 1320. The user may transmit and receive data through either the electronic device 1310 or the external electronic device 1320.

According to an example embodiment, when the electronic device 1310 and the external electronic device 1320 cannot be connected directly via a USB cable, they may be connected to each other through a gender (e.g., on-the-go gender (OTG)) 1340. For example, when the USB type of the electronic device 1310 is different from the USB type of the external electronic device 1320, the electronic device 1310 and the external electronic device 1320 may be connected to each other using the OTG gender, thereby transmitting and receiving data. As another example, even when the gender 1340 (e.g., OTG gender) is absent, the electronic device 1310 and the external electronic device 1320 may be connected to each other directly via the USB cable. According to an example embodiment, the electronic device 1310 may transmit various types of data such as contacts, messages, calendars, memos, applications, etc., to the external electronic device 1320 via an application (e.g., a smart switch) or may receive various types of data from the external electronic device 1320. According to an example embodiment, when a problem that the data cannot be transmitted or received based on the USB communication 1341 temporarily occurs while the electronic device 1310 and the external electronic device 1320 transmits/receives various types of data through the USB communication 1341, at least one of the electronic device 1310 and the external electronic device 1320 may further perform the WSB communication 1342 to continue to transmit and receive data. According to an example embodiment, the application (e.g., a smart switch) may additionally perform the WSB communication 1342 to ask a user to continue to transmit and receive data.

According to an example embodiment, when the electronic device 1310 and the external electronic device 1320 support the USB type C, the electronic device 1310 or the external electronic device 1320 may select a device operating as the host role automatically or based on a user's selection.

According to an example embodiment, since the electronic device 1310 or the external electronic device 1320 supports the host role and the device role, the host role or the device role may be selectively applied to each file, function, and item.

Figure 14:
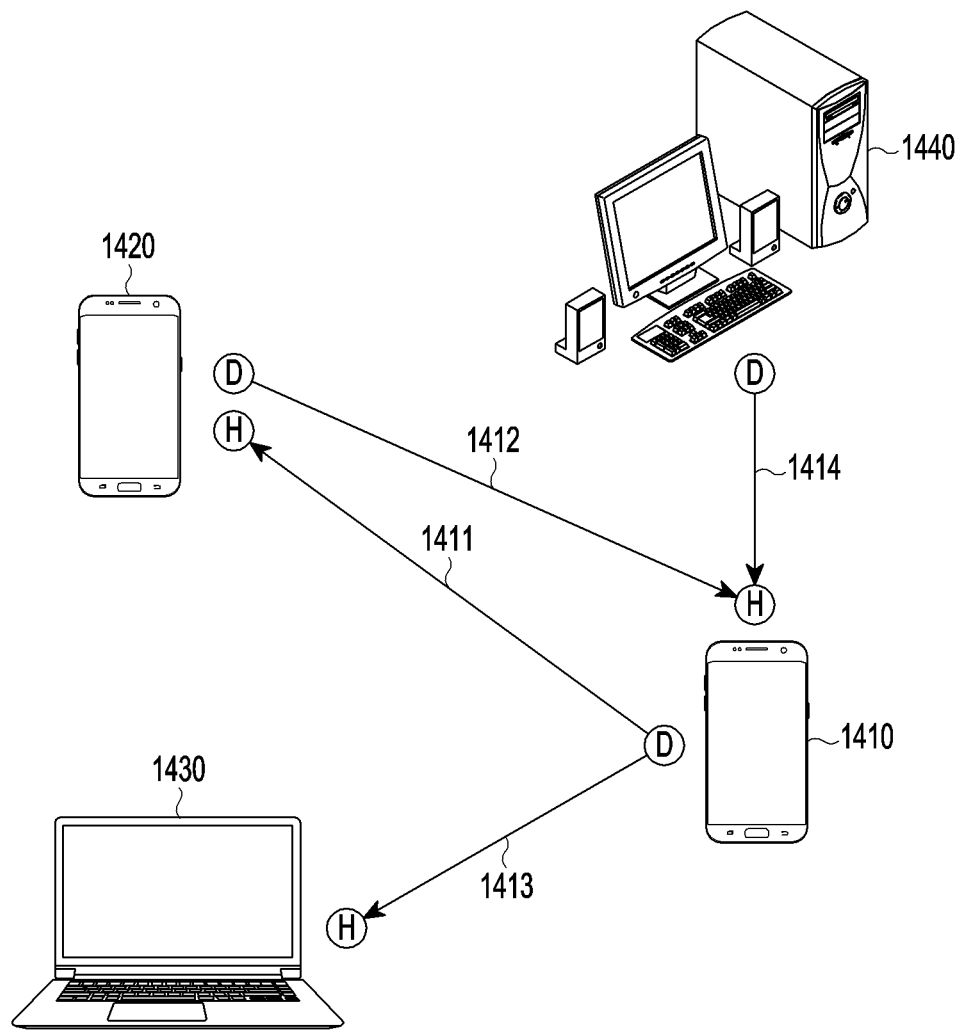
FIG. 14 is a diagram illustrating a case in which an electronic device communicates with a plurality of external electronic devices based on a dual role according to an embodiment.

FIG. 14 is a diagram illustrating a case in which an electronic device communicates with a plurality of external electronic devices based on a dual role according to an embodiment.

Referring to FIG. 14, an electronic device 1410 or a plurality of external electronic devices 1420, 1430, and 1440 may simultaneously support the host role and the device role. According to an example embodiment, the electronic device 1410 may communicate with at least one external electronic device 1420, 1430, and 1440 via USB communication or WSB communication. Since the electronic device 1410 may simultaneously support the host role and the device role based on the USB and the WSB, the electronic device 1410 may simultaneously operate as the host role and the device role or may operate as one role (e.g., the host role "H" or the device role "D"). For example, the electronic device 1410 may support a first communication 1411 using the USB and second communication 1412 using the WSB with the first external electronic device 1420. As another example, the electronic device 1410 may be connected to the first external electronic device 1420 through the first communication 1411 using the WSB and the second communication 1412 using the WSB. As another example, the electronic device 1410 may support communication 1413 with the second external electronic device 1430 and the WSB. For example, the electronic device 1410 may support communication 1414 using the USB with the third external electronic device 1440. The electronic device 1410 may transmit and receive data to and from at least one external electronic device 1420, 1430, and 1440 via the dual role (e.g., host role and device role).

According to an example embodiment, the electronic device 1410 may be connected to the first external electronic device 1420 in the device roll in the WSB-based first communication 1411, and may be connected to the first external electronic device 1420 in the host role in the WSB-based second communication 1412. The first external electronic device 1420 may be a portable terminal. As another example, the electronic device 1410 may be connected to the second external electronic device 1430 in the device role in the WSB-based third communication 1413. In this case, the second external electronic device 1430 may be operated as the host role in the third communication 1413. The second external electronic device 1430 may be a notebook. As another example, the electronic device 1410 may be connected to the third external electronic device 1440 in the host role in the USB-based fourth communication 1414. In this case, the third external electronic device 1440 may operate as the device role in the fourth communication 1414. The third external electronic device 1440 may be a desktop. In this manner, the electronic device 1410 may utilize peripheral devices (e.g., keyboard, mouse, printer, etc.) connected to each of the external electronic devices 1420, 1430, and 1440 based on the dual role. The electronic device 1410 may perform bidirectional communication with a plurality of external electronic devices based on the host role and the device role. As described above, the electronic device 1410 may simultaneously operate as the host role and the device roll or may operate as one role (e.g., host role or device role) according to the external electronic devices 1420, 1430, and 1440.

Figure 15:
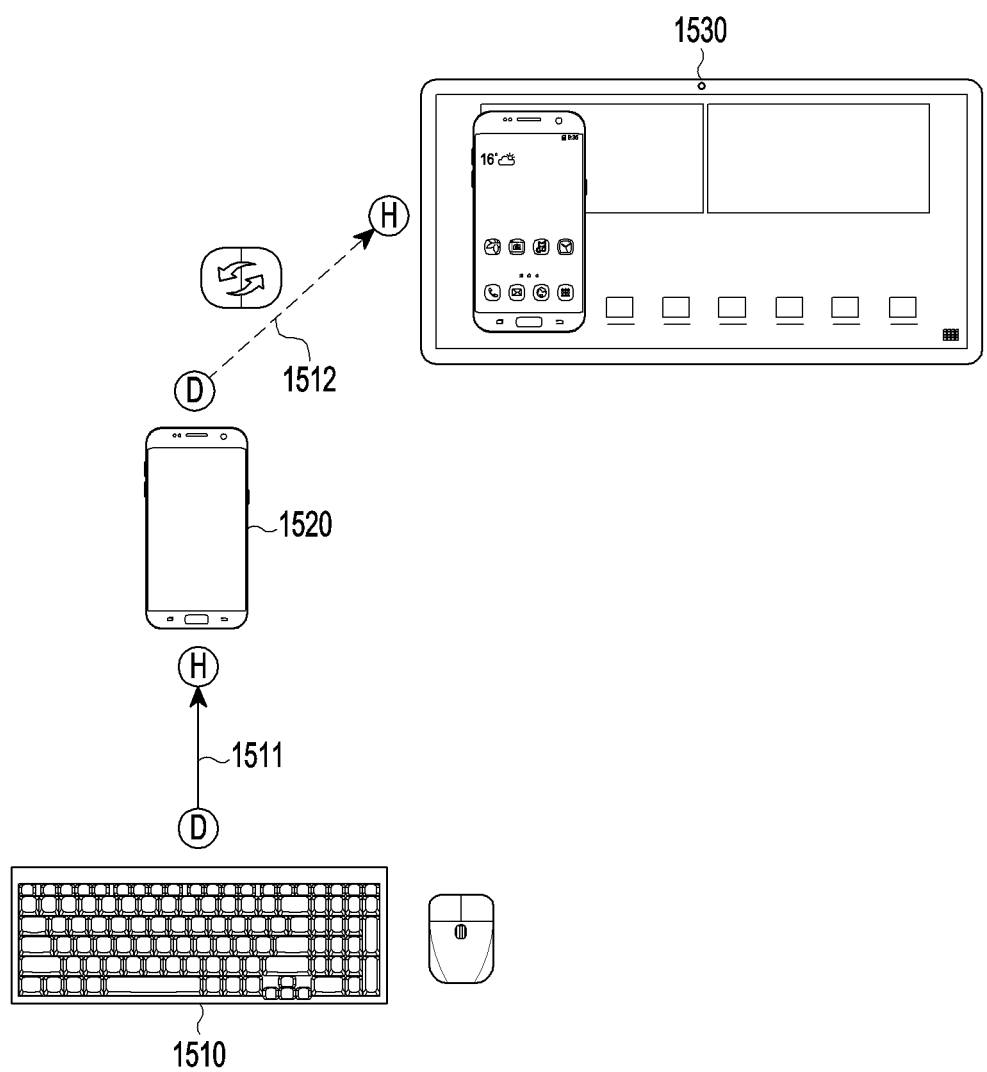
FIG. 15 is a diagram illustrating a case in which an electronic device communicates with a plurality of external electronic devices based on a dual role according another embodiment.

FIG. 15 is a diagram illustrating a case in which an electronic device communicates with a plurality of external electronic devices based on a dual role according another embodiment.

According to an example embodiment, an electronic device 1520 may support the host role (H) and the device role (D) simultaneously. For example, the electronic device 1520 may receive data from a first external electronic device 1510 (e.g., keyboard, mouse, etc.) via first communication 1511 based on the host role, and may transmit data to a second external electronic device 1530 (e.g., tablet PC) via second communication 1512 based on the device role. The second external electronic device 1530 may provide a larger screen than the electronic device 1520 and may perform various operations such as watching a moving image, editing a document, sharing a screen, and the like. The electronic device 1520 and the second external electronic device 1530 may include a program (e.g., a side sync) for supporting various operations such as watching a moving image, editing a document, sharing a screen, and the like. In this manner, the electronic device 1520 simultaneously supports the host role and the device role so that a user may control the second external electronic device 1530 displaying the data of the electronic device 1520 via the first external electronic device 1510. For example, when a user desires to view data (e.g., image or photo) stored in the electronic device 1520 via the second external electronic device 1530 using the first external electronic device 1510 such as a keyboard or a mouse, the electronic device 1520 may operate as the host role with the first external electronic device 1510 and as the device role with the second external electronic device 1530 (e.g., Galaxy View). The image and sound of the data stored in the electronic device 1520 may be transmitted to the second external electronic device 1530 (e.g., Galaxy View) through a side sync operated in the electronic device 1520. This allows the user to operate the electronic device 1520 by manipulating a keyboard or a mouse such as using a desktop computer. According to an example embodiment, the images and sounds stored in the electronic device 1520 may be transmitted to the second external electronic device 1530 via the second communication 1512.

According to an example embodiment, the electronic device 1520 may operate as the host role in the first communication using the USB with the first external electronic device 1510 and may operate as the device role using the WSB with the second external electronic device 1530 to relay signals between the first external electronic device 1510 and the second external electronic device 1530. Each of the external electronic devices 1510 and 1530 may support the first communication using the USB or the second communication using the WSB. An example embodiment is also applicable to the opposite case of the above-described operation.

Figure 16:
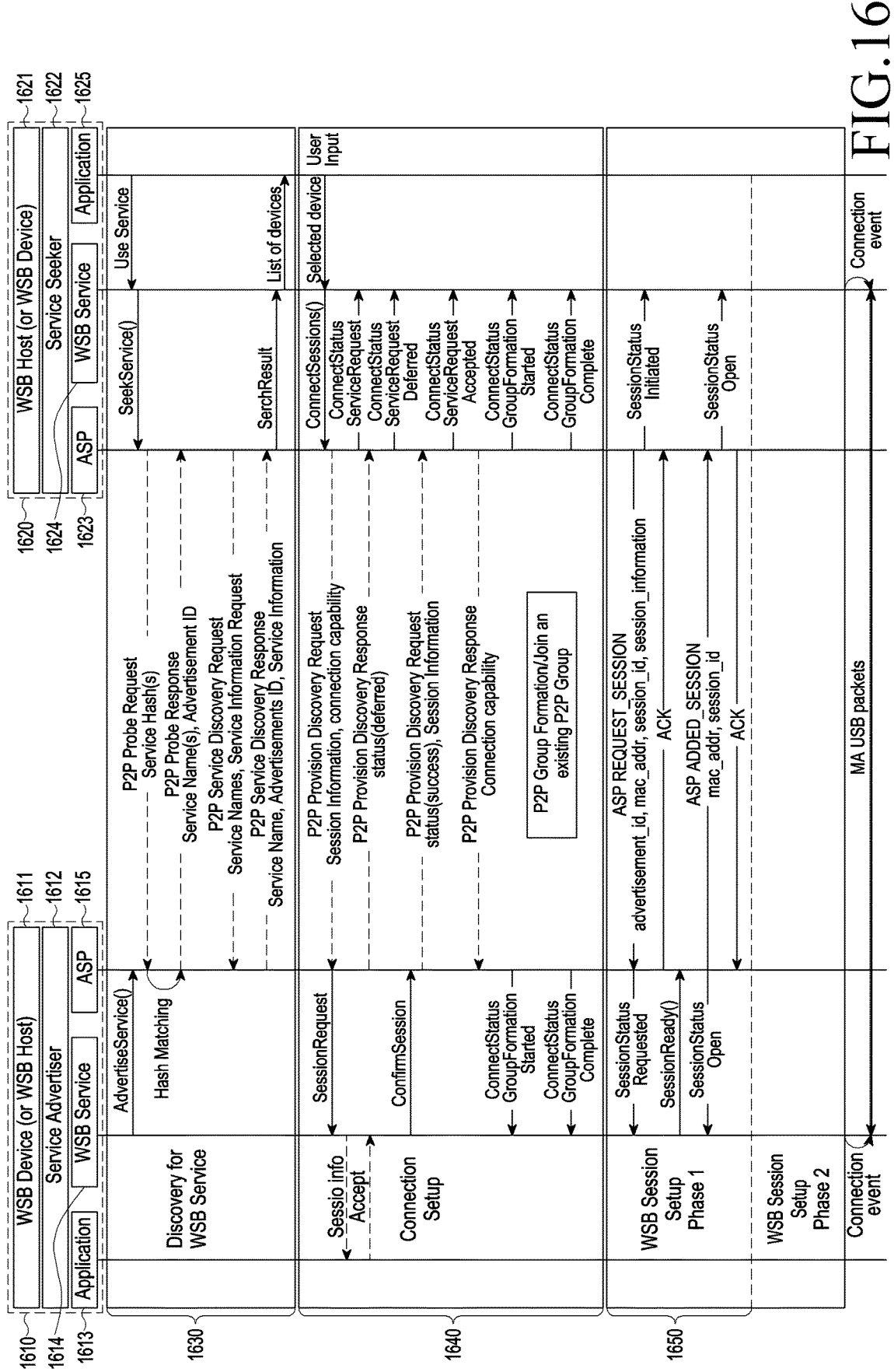
FIG. 16 is a diagram illustrating WSB service setup between an electronic device and an external electronic device according to an embodiment.

FIG. 16 is a diagram illustrating WSB service setup between an electronic device and an external electronic device according to an embodiment.

Referring to FIG. 16, an electronic device 1610 may operate as a WSB device (or host), and an external electronic device 1620 may operate as a WSB host (or device). As another example, the electronic device 1610 and the external electronic device 1620 may simultaneously operate as the WSB device and the WSB host, respectively. The electronic device 1610 and the external electronic device 1620 may each include applications 1613 and 1625, WSB service components 1614 and 1624, and ASP components 1615 and 1623. According to an example embodiment, the electronic device 1610 may advertise services via a service advertiser 1612 and the external electronic device 1620 may advertise services via a service seeker 1622.

According to various embodiments, a WSB service setup operation between the electronic device 1610 and the external electronic device 1620 may include a WSB discovery operation 1630, a connection setup operation 1640, and at least one WSB session setup operation 1650.

According to various embodiments, in the WSB discovery operation 1630, the external electronic device 1620 may activate a service advertiser (e.g., the service advertiser 1622 of FIG. 16) to retrieve the service, and the ASP component 1623 of the external electronic device 1620 may transmit a P2P probe request to the electronic device 1610. The ASP component 1615 of the electronic device 1610 may perform hash matching in response to the P2P probe request, and may transmit a P2P probe response to the external electronic device 1620 (e.g., the ASP 1623 component of the external electronic device 1620). The ASP component 1623 of the external electronic device 1620 may transmit a P2P service discovery request including a service name and a service information request to the electronic device 1610 (e.g., the ASP component 1615). In response to the P2P service discovery request, the electronic device 1610 (e.g., the ASP component 1615 of the electronic device 1610) may transmit the P2P service discovery response including a service name, an advertisement ID, and service information to the external electronic device 1620 (e.g., the ASP component 1623 of the external electronic device 1620).

According to various embodiments, in the connection operation 1640, the external electronic device 1620 (e.g., the ASP component 1623 of the external electronic device 1620) may transmit a P2P provision discovery request including session information and connection capability to the electronic device 1610 (e.g., ASP component 1615 of electronic device 1610). The ASP component 1615 of the electronic device 1610 may transmit the session request to the WSB service component 1614 of the electronic device 1610, and the WSB service component 1614 of the electronic device 1610 may transmit session confirmation to the ASP component 1615 of the electronic device 1610 based on a session acceptance of the application 1613 of the electronic device 1610. The electronic device 1610 (e.g., the ASP component 1615 of the electronic device 1610) may transmit a P2P provision discovery response to the external electronic device 1620 (e.g., the ASP component 1623 of the external electronic device 1620) in response to the received P2P provision discovery request. The electronic device 1610 (e.g., the ASP component 1615 of the electronic device 1610) may transmit the P2P provision discovery request including session information to the external electronic device 1620 (e.g., the ASP component 1623 of the external electronic device 1620), and the external electronic device 1620 may transmit a P2P provision discovery response including connection capability as session information to the electronic device 1610 (e.g., the ASP component 1615 of the electronic device 1610) in response to the received P2P provision discovery request.

According to various embodiments, in the WSB session setup operation 1650, the external electronic device 1620 (e.g., the ASP component 1623 of the external electronic device 1620) may transmit an ASP request-session including advertisement_ID, MAC address, session_ID, and session information to the electronic device 1610 (e.g., the ASP component 1615 of the electronic device 1610). The ASP component 1623 of the external electronic device 1620 may transmit a session state initialized with the WSB service component 1624.

According to an example embodiment, the electronic device 1610 (e.g., the ASP component 1615 of the electronic device 1610) may transmit an ACK to the external electronic device 1620 (e.g., the ASP component 1623 of the external electronic device 1620) in response to the received ASP request session. For example, the electronic device 1610 (e.g., the ASP 1615 component of the electronic device 1610) may transmit an ASP added_session including the MAC_address and the session_ID to the external electronic device 1620 (e.g., the ASP component 1623 of the external electronic device 1620), and may transmit an ACK to the electronic device 1610 in response to the received ASP added_session. After the WSB session setup is performed between the electronic device 1610 and the external electronic device 1620, the electronic device 1610 and the external electronic device 1620 may transmit and receive MA USB packets.

The term "module" as used herein may include a unit including hardware, software, and/or firmware, or any combinations thereof, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, and without limitation, a dedicated processor, a CPU, an Application-Specific Integrated Circuit (ASIC) chip, a Field-Programmable Gate Arrays (FPGA), and/or a programmable-logic device, or the like, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, or the like. The instruction may include a code made by a complier or a code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations. Furthermore, some operations may be executed in a different order or may be omitted, or other operations may be added. According to various embodiments, in a non-transitory storage medium storing instructions, the instructions may include a first command set that establishes a first communication with the external electronic device using the wireless communication circuit or the wired communication interface so that an electronic device operates as a device and an external electronic device including a storage unit operates as a host, a second command set that exchanges information with the external electronic device through the first communication channel after the first communication channel is established, and a third command set that establishes a second communication channel with the external electronic device using the wireless communication circuit so that the electronic device operates as a host and the external electronic device operates as a device.

Example embodiments illustrated and described in this disclosure and the drawings correspond to specific examples are presented in order to easily describe technical contents of the present disclosure and to aid in comprehension of the present disclosure, and are not intended to limit the scope of the present disclosure. Therefore, it should be understood that, in addition to the embodiments disclosed herein, all modifications and changes or modified and changed forms derived from the technical idea of the present disclosure fall within the scope of the present disclosure.

What is claimed is:

1. An electronic device comprising:
   a housing;
   a user interface;
   a wireless communication circuit disposed in the housing and configured to support a Wi-Fi serial bus (WSB) and/or a wireless universal serial bus (USB) protocol;
   a wired communication interface comprising wired communication circuitry exposed through the housing;
   a processor disposed in the housing and electrically connected to the user interface, the wireless communication circuit, and the wired communication interface; and
   a memory disposed in the housing and electrically connected to the processor,
   wherein the memory stores instructions that, when executed by the processor, cause the electronic device:
   to establish a first communication channel with an external electronic device including a storage using the wireless communication circuit and/or the wired communication interface so that the electronic device operates as a device and the external electronic device operates as a host,
   to exchange information with the external electronic device through the first communication channel,
   to establish a second communication channel with the external electronic device using the wireless communication circuit so that the electronic device operates as a host and the external electronic device operates as a device, and
   to retrieve information about files stored in the storage of the external electronic device through the second communication channel,
   wherein, the instructions, when executed by the processor, further cause the electronic device to exchange information including at least one of: a peer to peer (P2P) address, a USB role exchange, or capability of the WSB, based on the first communication channel, based on the first communication channel being established through the wired communication interface.

2. The electronic device of claim 1, wherein the wired communication interface includes a universal serial bus (USB) interface.

3. The electronic device of claim 1, wherein, the instructions, when executed by the processor, further cause the electronic device to exchange information including at least one of: a service name for the second communication channel, an advertisement identifier, and service information, through discovery with the external electronic device, when the first communication channel is established through the wireless communication circuit.

4. An electronic device comprising:
   a housing;
   a user interface;
   a wireless communication circuit disposed in the housing and configured to support a WSB and/or a wireless USB protocol;
   a processor disposed in the housing and electrically connected to the user interface and the wireless communication circuit; and
   a memory disposed in the housing and electrically connected to the processor,
   wherein the memory stores instructions that, when executed by the processor, cause the electronic device:
   to establish a first communication channel with an external electronic device including a storage using the wireless communication circuit so that the electronic device operates as a device and the external electronic device operates as a host, to exchange information with the external electronic device through the first communication channel,
   to establish a second communication channel with the external electronic device using the wireless communication circuit so that the electronic device operates as a host and the external electronic device operates as a device, and
   to retrieve information about files stored in the storage of the external electronic device through the second communication channel,
   wherein, the instructions, when executed by the processor, further cause the electronic device to exchange information including at least one of an advertisement identifier for the first communication channel, which is exchanged based on the established first communication channel, a session MAC for the first communication, a session identifier for the first communication, and session information about the first communication, based on the first communication channel being established through the wireless communication circuit.

5. The electronic device of claim 4, wherein, the instructions, when executed by the processor, further cause the electronic device to exchange information including at least one of: an advertisement identifier for the second communication channel, a session MAC for the second communication channel, a session identifier for the second communication channel, and session information about the second communication channel, to establish the second communication channel, when the first communication channel is established through second discovery using the wireless communication circuit.

6. The electronic device of claim 4, wherein the instructions, when executed by the processor, further cause the electronic device to exchange a multi-service name, a multi-advertisement identifier, service information, and information about dual role capability, to perform a multi-connection with the external electronic device through first discovery.

7. The electronic device of claim 6, wherein, the instructions, when executed by the processor, further cause the electronic device to exchange information including at least one of: an advertisement identifier for the first communication, a session MAC for the first communication, a session identifier for the first communication, and session information about the first communication, when the first communication channel is established with the external electronic device using the first discovery.

8. The electronic device of claim 6, wherein, the instructions, when executed by the processor, further cause the electronic device to exchange information including at least one of: an advertisement identifier for the second communication, a session MAC for the second communication, a session identifier for the second communication, and session information about the second communication, when the second communication channel is established after the first communication channel is established.

9. The electronic device of claim 4, wherein, the instructions, when executed by the processor, further cause the electronic device to exchange information including at least one of: an advertisement identifier for the first WSB, a session MAC, a session identifier, and session information, after the first communication channel using a first WSB is established through the wireless communication circuit.

10. The electronic device of claim 9, wherein, the instructions, when executed by the processor, further cause the electronic device to exchange information including at least one of: an advertisement identifier for the second WSB, a session MAC, a session identifier, and session information, after the second communication channel using a second WSB is established through the wireless communication circuit.

11. An electronic device comprising:
a housing;
a user interface;
a wireless communication circuit disposed in the housing and configured to support a WSB and/or a wireless USB protocol;
a wired communication interface exposed through the housing;
a processor disposed in the housing and electrically connected to the user interface, the wireless communication circuit, and the wired communication interface; and
a memory disposed in the housing and electrically connected to the processor,
wherein the memory stores instructions that, when executed by the processor, cause the electronic device:
to establish a first communication channel with an external electronic device including a storage using the wireless communication circuit and/or the wired communication interface so that the electronic device operates as a host and the external electronic device operates as a device,
to exchange information with the external electronic device through the first communication channel,
to establish a second communication channel with the external electronic device using the wireless communication circuit so that the electronic device operates as a device and the external electronic device operates as a host, and
to retrieve information about files stored in the storage unit of the external electronic device through the second communication channel,
wherein, the instructions, when executed by the processor, further cause the electronic device to exchange information including at least one of: a P2P address, a USB role exchange, and capability of the WSB, based on the first communication channel being established through the wired communication interface.

12. The electronic device of claim 11, wherein, the instructions, when executed by the processor, further cause the electronic device to exchange information including at least one of: a service name for the second communication channel, an advertisement identifier, and service information through discovery with the external electronic device, when the first communication channel is established using the wireless communication circuit.

* * * * *